(12) United States Patent
Oasa

(10) Patent No.: US 11,035,462 B2
(45) Date of Patent: Jun. 15, 2021

(54) WORK VEHICLE AND CONTROL METHOD FOR WORK VEHICLE

(71) Applicant: KOMATSU LTD., Tokyo (JP)

(72) Inventor: Takahisa Oasa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/621,383

(22) PCT Filed: Jan. 21, 2019

(86) PCT No.: PCT/JP2019/001672
§ 371 (c)(1),
(2) Date: Dec. 11, 2019

(87) PCT Pub. No.: WO2019/163360
PCT Pub. Date: Aug. 29, 2019

(65) Prior Publication Data
US 2020/0158235 A1 May 21, 2020

(30) Foreign Application Priority Data

Feb. 23, 2018 (JP) .............................. JP2018-030733

(51) Int. Cl.
*F16H 61/421* (2010.01)
*F16H 61/06* (2006.01)
(Continued)

(52) U.S. Cl.
CPC ......... *F16H 61/421* (2013.01); *E02F 9/2062* (2013.01); *E02F 9/2225* (2013.01);
(Continued)

(58) Field of Classification Search
CPC .... F16H 61/421; F16H 61/065; F16H 61/431; F16H 61/44; F16H 2059/366;
(Continued)

(56) References Cited

U.S. PATENT DOCUMENTS

| 6,276,134 B1 | 8/2001 | Matsuyama et al. |
| 2007/0144166 A1 | 6/2007 | Rueckgauer et al. |

(Continued)

FOREIGN PATENT DOCUMENTS

| CN | 1842429 A | 10/2006 |
| CN | 101137524 A | 3/2008 |

(Continued)

OTHER PUBLICATIONS

The Office Action for the corresponding Chinese application No. 201980002981.4, dated Jul. 30, 2020.

(Continued)

*Primary Examiner* — Abiy Teka
*Assistant Examiner* — Daniel S Collins
(74) *Attorney, Agent, or Firm* — Global IP Counselors, LLP

(57) ABSTRACT

When the vehicle speed increases and reaches a predetermined switching threshold, the controller reduces the displacement of the first travel motor and controls the flow rate control device to offset a flow rate excess in the hydraulic circuit in accordance with the reduction in the displacement of the first travel motor. After the vehicle speed has reached the switching threshold, the controller executes switching control to switch the clutch from an engaged state to a disengaged state.

8 Claims, 18 Drawing Sheets

(51) Int. Cl.
  *E02F 9/20* (2006.01)
  *E02F 9/22* (2006.01)
  *F16H 59/36* (2006.01)
  *F16H 61/431* (2010.01)
  *F16H 61/44* (2006.01)

(52) U.S. Cl.
  CPC ......... *E02F 9/2267* (2013.01); *E02F 9/2278* (2013.01); *F16H 59/36* (2013.01); *F16H 61/065* (2013.01); *F16H 61/431* (2013.01); *F16H 61/44* (2013.01); *F16H 2059/366* (2013.01)

(58) Field of Classification Search
  CPC ..... E02F 9/2062; E02F 9/2225; E02F 9/2267; E02F 9/2278
  USPC .......................................................... 60/425
  See application file for complete search history.

(56) References Cited

U.S. PATENT DOCUMENTS

| | | |
|---|---|---|
| 2007/0235241 A1 | 10/2007 | Udagawa et al. |
| 2008/0271564 A1 | 11/2008 | Uezono et al. |
| 2009/0045003 A1 | 2/2009 | Shirao et al. |
| 2010/0009806 A1* | 1/2010 | Shirao ............... B60W 30/188 477/52 |
| 2010/0024409 A1 | 2/2010 | Shiina et al. |
| 2010/0263361 A1 | 10/2010 | Kodaka et al. |
| 2010/0317486 A1 | 12/2010 | Hyodo et al. |
| 2011/0196585 A1 | 8/2011 | Ishibashi et al. |
| 2013/0131937 A1 | 5/2013 | Anderson et al. |
| 2013/0136624 A1 | 5/2013 | Kitao et al. |
| 2015/0057899 A1 | 2/2015 | Kohmaescher |
| 2015/0204354 A1 | 7/2015 | Krittian |
| 2016/0024755 A1 | 1/2016 | Kobiki |
| 2017/0305426 A1 | 10/2017 | Balboni et al. |

FOREIGN PATENT DOCUMENTS

| | | |
|---|---|---|
| CN | 101317027 A | 12/2008 |
| CN | 101501368 A | 8/2009 |
| CN | 101563555 A | 10/2009 |
| CN | 101606010 A | 12/2009 |
| CN | 102245940 A | 11/2011 |
| CN | 103958252 A | 7/2014 |
| CN | 104421424 A | 3/2015 |
| CN | 104712723 A | 6/2015 |
| CN | 105074280 A | 11/2015 |
| CN | 106795963 A | 5/2017 |
| EP | 2 187 027 A1 | 5/2010 |
| JP | 11-230333 A | 8/1999 |
| JP | 2000-193065 A | 7/2000 |
| JP | 2006-258119 A | 9/2006 |
| JP | 2009-24747 A | 2/2009 |
| JP | 2012-229790 A | 11/2012 |
| WO | 2006/025519 A1 | 3/2006 |

OTHER PUBLICATIONS

The International Search Report for the corresponding international application No. PCT/JP2019/001672, dated Apr. 23, 2019.
The extended European search report for the corresponding European application No. 19756909.8, dated Dec. 8, 2020.

* cited by examiner

WORK VEHICLE AND CONTROL METHOD FOR WORK VEHICLE

CROSS-REFERENCE TO RELATED APPLICATIONS

This application is a U.S. National stage application of International Application No. PCT/JP2019/001672, filed on Jan. 21, 2019. This U.S. National stage application claims priority under 35 U.S.C. § 119(a) to Japanese Patent Application No. 2018-030733, filed in Japan on Feb. 23, 2018, the entire contents of which are hereby incorporated herein by reference.

BACKGROUND

Field of the Invention

The present invention relates to a work vehicle and a control method for the work vehicle.

Background Information

Work vehicles may be provided with a hydrostatic transmission. A hydrostatic transmission includes a travel pump, a hydraulic circuit, a first travel motor, and a second travel motor. The travel pump is driven by an engine to discharge hydraulic fluid. The hydraulic fluid discharged by the travel pump is supplied to the first travel motor and the second travel motor via the hydraulic circuit. The first travel motor and the second travel motor are connected to a travel device of the work vehicle via a drive shaft, and the first travel motor and the second travel motor are driven whereby the work vehicle travels. The transmission gear ratio is controlled in the hydrostatic transmission by controlling the displacement of the travel pump, the displacement of the first travel motor, and the displacement of the second travel motor.

In addition, the work vehicle is provided with a clutch for switching between travel with one motor and travel with two motors. The clutch is disposed between the first travel motor and the drive shaft and switched between an engaged state and a disengaged state. In the engaged state of the clutch, the first travel motor is connected to the drive shaft and the rotation of the first travel motor is transmitted to the drive shaft. As a result, the work vehicle travels due to the output of the first travel motor and the output of the second travel motor.

In the disengaged state of the clutch, the first travel motor is not connected to the drive shaft and the rotation of the first travel motor is not transmitted to the drive shaft. As a result, the work vehicle travels only due to the output of the second travel motor. A controller controls the clutch in response to the vehicle speed so that travel is performed with two motors at a low speed, and travel is performed with one motor at a high speed.

SUMMARY

FIG. 19 illustrates the control of a clutch according to a related technique. As illustrated in FIG. 19, when the vehicle speed increases and reaches the speed Va at the time point t1, the controller starts to reduce the displacement of the first travel motor in the control of the clutch according to the related technique. When the displacement of the first travel motor reaches a displacement threshold Dth at the time point t2, the controller switches the clutch from the engaged state to a disengaged state. As a result, travel with two motors is switched to travel with one motor. The displacement of the first travel motor reaches zero at the time point t3. When the vehicle speed increases further and reaches the speed Vb at the time point t4, the controller reduces the displacement of the second travel motor in response to an increase in the vehicle speed. As a result, the transmission gear ratio of the hydrostatic transmission is controlled in response to the vehicle speed.

In the control of the clutch according to the above example, the displacement of the first travel motor is rapidly reduced between the time point t1 and the time point t3 whereby the flow rate of the hydraulic fluid changes greatly in the hydraulic circuit of the hydrostatic transmission. This change in the flow rate is a factor in causing speed change shock in the work vehicle.

An object of the present invention is to reduce speed change shock when switching from travel with two motors to travel with one motor in a work vehicle provided with a hydrostatic transmission.

A work vehicle according to a first aspect is provided with an engine, a travel pump, a hydraulic circuit, a first travel motor, a second travel motor, a flow rate control device, a drive shaft, a clutch, a sensor, and a controller. The travel pump is driven by the engine. The hydraulic circuit is connected to the travel pump. The first travel motor is connected to the travel pump via the hydraulic circuit. The second travel motor is connected to the travel pump via the hydraulic circuit. The flow rate control device controls the flow rate of hydraulic fluid in the hydraulic circuit. The drive shaft is connected to the first travel motor and the second travel motor. The clutch is disposed between the first travel motor and the drive shaft. The sensor outputs a signal indicative of the vehicle speed. The controller receives the signal from the sensor and controls the first travel motor and the clutch. When the vehicle speed increases and reaches a predetermined switching threshold, the controller reduces the displacement of the first travel motor and controls the flow rate control device to offset a flow rate excess in the hydraulic circuit in accordance with the reduction in the displacement of the first travel motor. After the vehicle speed has reached a switching threshold, the controller performs switching control to switch the clutch from an engaged state to a disengaged state.

In the work vehicle according to the present aspect, the flow rate of the hydraulic fluid in the hydraulic circuit is controlled so that the displacement of the first travel motor is reduced and the excess flow rate in the hydraulic circuit is offset in accordance with the reduction of the displacement of the first travel motor during the clutch switching control. As a result, a change in the flow rate of the hydraulic fluid in the hydraulic circuit when the displacement of the first travel motor is reduced is minimized. As a result, the occurrence of speed change shock can be suppressed.

The flow rate control device may be a device for controlling the flow rate of the second travel motor. In addition to reducing the displacement of the first travel motor in the switching control, the controller may control the flow rate control device and increase the displacement of the second travel motor to offset the flow rate excess in the hydraulic circuit in response to the reduction of the displacement of the first travel motor. In this case, the change of the flow rate in the hydraulic circuit during the switching control can be minimized by increasing the displacement of the second travel motor.

The controller may control the flow rate control device and reduce the displacement of the second travel motor when the vehicle speed increases and before the vehicle speed reaches the switching threshold. In this case, the displacement of the second travel motor is reduced before the vehicle speed reaches the switching threshold. As a result, the displacement of the second travel motor can be increased when the vehicle speed reaches the switching threshold.

In addition to controlling the flow rate control device and reducing the displacement of the second travel motor when the vehicle speed increases and before the vehicle speed reaches the switching threshold, the controller may lower the rotation speed of the engine. In this case, a desired vehicle speed can be achieved by lowering the rotation speed of the engine even when the displacement of the second travel motor is reduced.

The flow rate control device may be a device for controlling the displacement of the travel pump. In addition to reducing the displacement of the first travel motor during the switching control, the controller may control the flow rate control device and reduce the displacement of the travel pump to offset the flow rate excess in the hydraulic circuit in accordance with the reduction in the displacement of the first travel motor. In this case, the change in the flow rate in the hydraulic circuit during the switching control can be minimized by reducing the displacement of the travel pump.

The flow rate control device may be a device for controlling the rotation speed of the engine. In addition to reducing the displacement of the first travel motor in the switching control, the controller may control the flow rate control device and reduce the rotation speed of the engine to offset the flow rate excess in the hydraulic circuit in accordance with the reduction of the displacement of the first travel motor. In this case, the change in the flow rate in the hydraulic circuit during the switching control can be minimized by reducing the rotation speed of the engine.

The flow rate control device may be a relief valve provided in the hydraulic circuit and configured to change the relief pressure. In addition to reducing the displacement of the first travel motor during the switching control, the controller may control the flow rate control device and reduce the relief pressure of the relief valve to offset the flow rate excess in the hydraulic circuit in accordance with the reduction in the displacement of the first travel motor. In this case, the change in the flow rate in the hydraulic circuit during the switching control can be minimized by reducing the relief pressure of the relief valve.

A method according to a second aspect is a method performed by a controller for controlling a work vehicle. The work vehicle is provided with an engine, a travel pump, a hydraulic circuit, a first travel motor, a second travel motor, a flow rate control device, a drive shaft, and a clutch. The travel pump is driven by the engine. The hydraulic circuit is connected to the travel pump. The first travel motor is connected to the travel pump via the hydraulic circuit. The second travel motor is connected to the travel pump via the hydraulic circuit. The flow rate control device controls the flow rate of hydraulic fluid in the hydraulic circuit. The drive shaft is connected to the first travel motor and the second travel motor. The clutch is disposed between the first travel motor and the drive shaft. The control method according to the present aspect includes the following processing. The first process involves receiving a signal indicative of the vehicle speed. The second process involves reducing the displacement of the first travel motor and controlling the flow rate control device to offset the flow rate excess in the hydraulic circuit in accordance with the reduction in the displacement of the first travel motor when the vehicle speed increases and reaches a predetermined switching threshold. The third process involves executing a switching control to switch the clutch from an engaged state to a disengaged state after the vehicle speed has reached the switching threshold.

In the method according to the present aspect, the displacement of the first travel motor is reduced and the flow rate of the hydraulic fluid in the hydraulic circuit is controlled so that the flow rate excess in the hydraulic circuit is offset in accordance with the reduction in the displacement of the first travel motor during the clutch switching control. As a result, the change in the flow rate of the hydraulic fluid in the hydraulic circuit when the displacement of the first travel motor is reduced is minimized. As a result, the occurrence of speed change shock can be suppressed.

According to the present invention, speed change shock that occurs when switching from travel with two motors to travel with one motor can be reduced in a work vehicle provided with a hydrostatic transmission.

DETAILED DESCRIPTION OF EMBODIMENT(S)

Figure 1:
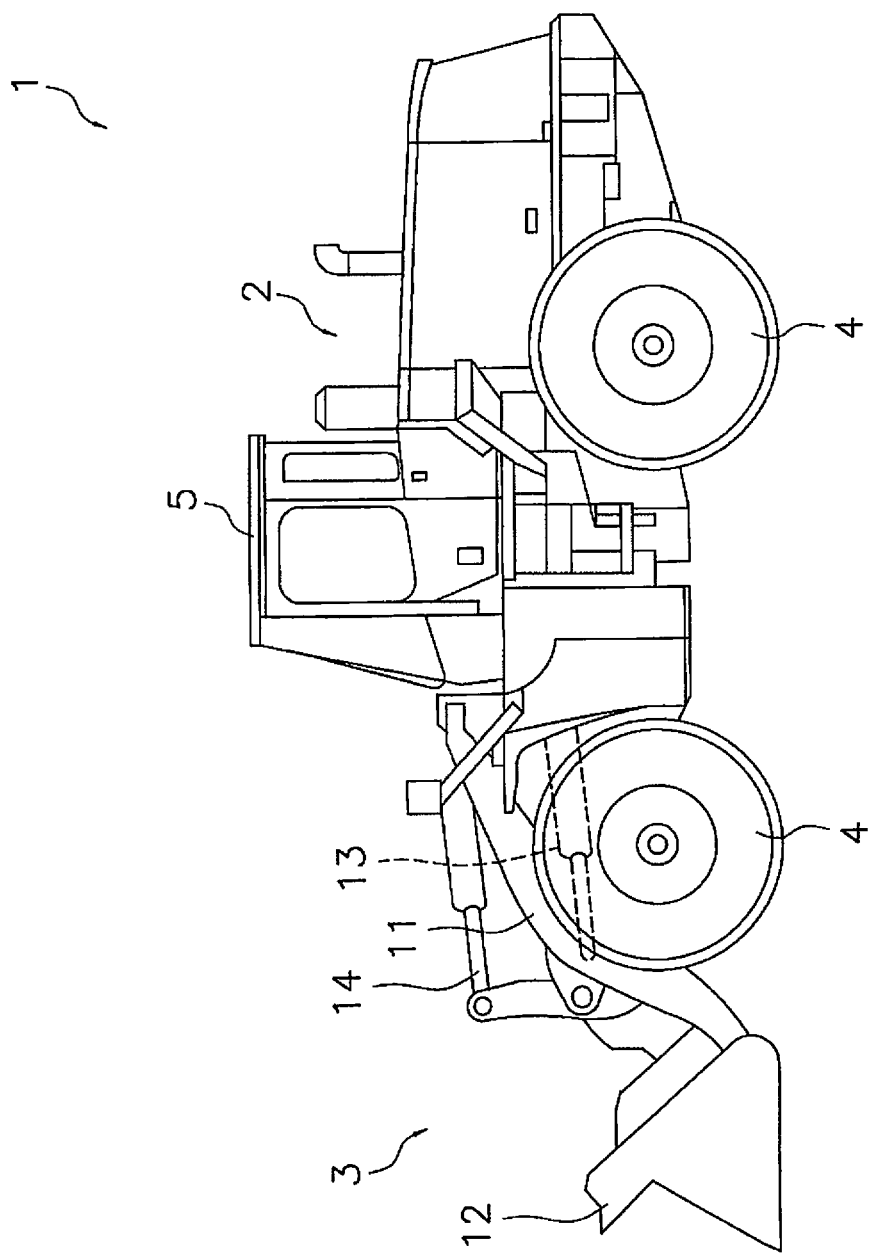
FIG. 1 is a side view of a work vehicle according to an embodiment.

Herein, a work vehicle 1 according to a first embodiment of the present invention will be explained with reference to the drawings. FIG. 1 is a side view of the work vehicle 1. The work vehicle 1 is a wheel loader. The work vehicle 1 includes a vehicle body 2, a work implement 3, a plurality of traveling wheels 4, and a cab 5. The work implement 3 is mounted onto a front portion of the vehicle body 2. The work implement 3 includes a boom 11, a bucket 12, a lift cylinder 13, and a bucket cylinder 14.

The boom 11 is rotatably attached to the vehicle body 2. The boom 11 is driven by the lift cylinder 13. The bucket 12 is rotatably attached to the boom 11. The bucket 12 moves up and down due to the bucket cylinder 14. The cab 5 is disposed on the vehicle body frame 2. The plurality of traveling wheels 4 are rotatably attached to the vehicle body 2.

Figure 2:
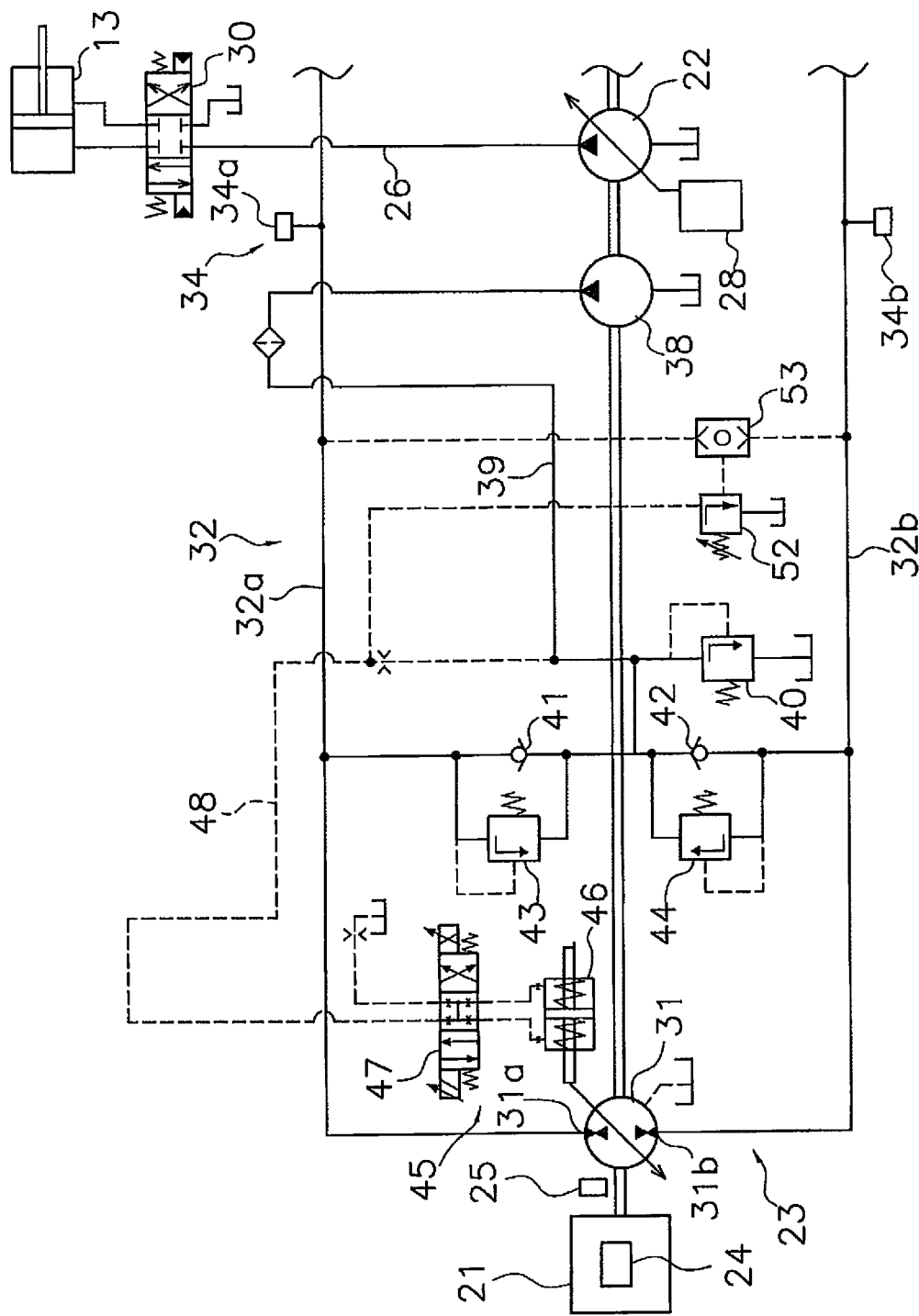
FIG. 2 is a block diagram illustrating a configuration of a drive system of the work vehicle.
Figure 3:
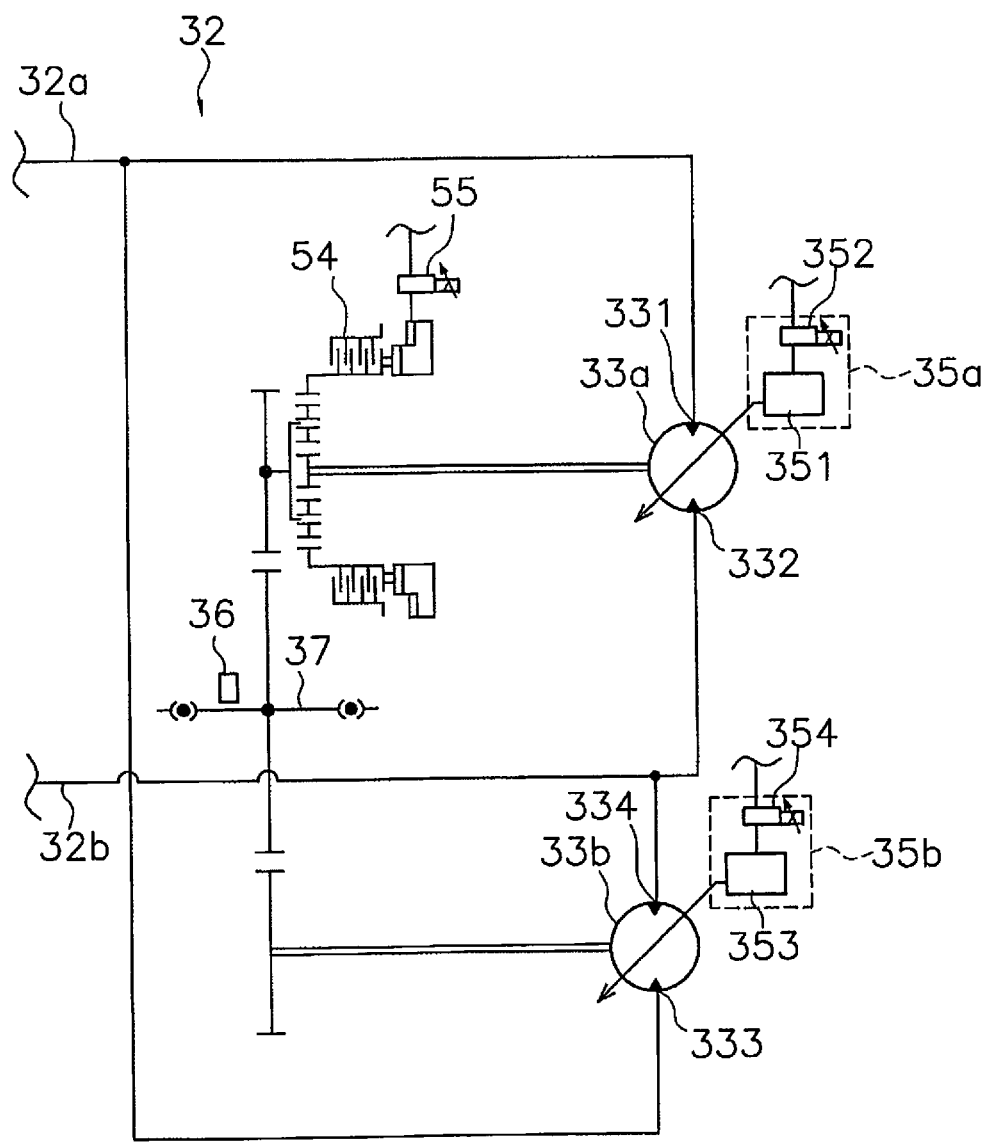
FIG. 3 is a block diagram illustrating a configuration of the drive system of the work vehicle.

FIGS. 2 and 3 are block diagrams illustrating a configuration of a drive system mounted on the work vehicle 1. As illustrated in FIG. 2, the work vehicle 1 includes an engine 21, a work implement pump 22, and a hydrostatic transmission (referred to below as 'HST") 23. The engine 21 is, for example, a diesel engine. The output torque (referred to below as "engine torque") and the rotation speed of the engine 21 are controlled by the control of a fuel injection device 24 that controls the fuel injection amount to the engine 21. The actual rotation speed of the engine 21 is detected by an engine rotation speed sensor 25. The engine rotation speed sensor 25 outputs a signal which indicates the actual rotation speed of the engine 21.

The work implement pump 22 is connected to the engine 21. The work implement pump 22 is driven by the engine 21 and discharges hydraulic fluid. The hydraulic fluid discharged from the work implement pump 22 is supplied through a work implement hydraulic circuit 26 to the lift cylinder 13. As a result, the work implement 3 is driven.

The work implement pump 22 is a variable displacement hydraulic pump. A work implement pump control device 28 is connected to the work implement pump 22. The work implement pump control device 28 controls the displacement of the work implement pump 22. The work implement pump 22 may also be a fixed displacement hydraulic pump.

A work implement control valve 30 is disposed in the work implement hydraulic circuit 26. The working equipment control valve 30 controls the flow rate of the hydraulic fluid supplied to the lift cylinder 13 in response to a pilot pressure applied to the work implement control valve 30. While not illustrated in the drawings, the work implement control valve 30 may also control the flow rate of hydraulic fluid to be supplied to the bucket cylinder 14. The flow rate of the hydraulic fluid signifies the amount of hydraulic fluid supplied per unit of time. The work implement control valve 30 is not limited to a pressure pilot control valve and may be an electromagnetic proportional control valve which is controlled electrically. An operator operates an unillustrated work implement operating member whereby the work implement control valve 30 is controlled. Consequently, the operator is able to operate the work implement 3.

As illustrated in FIGS. 2 and 3, the HST 23 includes a travel pump 31, a drive hydraulic circuit 32, a first travel motor 33*a*, and a second travel motor 33*b*. The travel pump 31 is connected to the engine 21. The travel pump 31 is driven by the engine 21 to discharge hydraulic fluid. The travel pump 31 is a variable displacement hydraulic pump. The hydraulic fluid discharged by the travel pump 31 passes through the drive hydraulic circuit 32 and is delivered to the travel motors 33*a* and 33*b*.

The drive hydraulic circuit 32 connects the travel pump 31 and the travel motors 33*a* and 33*b*. The drive hydraulic circuit 32 includes a first drive circuit 32*a* and a second drive circuit 32*b*. The first drive circuit 32*a* connects a first pump port 31*a* of the travel pump 31 and a first motor port 331 of the first travel motor 33*a*. The first drive circuit 32*a* also connects the first pump port 31*a* of the travel pump 31 and a first motor port 333 of the second travel motor 33*b*. The second drive circuit 32*b* connects a second pump port 31*b* of the travel pump 31 and a second motor port 332 of the first travel motor 33*a*. The second drive circuit 32*b* also connects the second pump port 31*b* of the travel pump 31 and a second motor port 334 of the second travel motor 33*b*. The travel pump 31, the travel motors 33*a* and 33*b*, the first drive circuit 32*a*, and the second drive circuit 32*b* are configured as a closed circuit.

The hydraulic fluid is supplied from the travel pump 31, through the first drive circuit 32*a* to the travel motors 33*a* and 33*b*, and the travel motors 33*a* and 33*b* are driven in one direction (for example, the forward direction). In this case, the hydraulic fluid returns from the travel motors 33*a* and 33*b* through the second drive circuit 32*b* to the travel pump 31. In addition, the hydraulic fluid is supplied from the travel pump 31 to the travel motors 33*a* and 33*b* through the second drive circuit 32*b*, whereby the travel motors 33*a* and 33*b* are driven in another direction (for example, the reverse direction). In this case, the hydraulic fluid returns from the travel motors 33*a* and 33*b* through the first drive circuit 32*a* to the travel pump 31.

A drive circuit pressure sensor 34 is provided in the drive hydraulic circuit 32. The drive circuit pressure sensor 34 detects the pressure of the hydraulic fluid supplied through the first drive circuit 32*a* or the second drive circuit 32*b* to the first travel motor 33*a*. Specifically, the drive circuit pressure sensor 34 includes a first circuit pressure sensor 34*a* and a second circuit pressure sensor 34*b*.

The first circuit pressure sensor 34*a* detects the hydraulic pressure of the first drive circuit 32*a*. The second circuit pressure sensor 34*b* detects the hydraulic pressure of the second drive circuit 32*b*. The first circuit pressure sensor 34*a* outputs a signal which indicates the hydraulic pressure of the first drive circuit 32*a*. The second circuit pressure sensor 34*b* outputs a signal which indicates the hydraulic pressure of the second drive circuit 32*b*.

The travel motors 33*a* and 33*b* are variable displacement hydraulic motors. The travel motors 33*a* and 33*b* are driven by the hydraulic fluid discharged from the travel pump 31 so that driving power for traveling is produced.

A first motor displacement control device 35*a* is connected to the first travel motor 33*a*. The first motor displacement control device 35*a* controls the displacement of the first travel motor 33*a*. The first motor displacement control device 35*a* includes a first motor cylinder 351 and a first motor control valve 352.

The first motor cylinder 351 is connected to the first travel motor 33*a*. The first motor cylinder 351 is driven by hydraulic pressure and changes the tilt angle of the first travel motor 33*a*. The first motor control valve 352 is an electromagnetic proportional control valve controlled on the basis of an instruction signal inputted to the first motor control valve 352. The first motor cylinder 351 is actuated by the first motor control valve 352 whereby the displacement of the first travel motor 33*a* is changed.

A second motor displacement control device 35*b* is connected to the second travel motor 33*b*. The second motor displacement control device 35*b* controls the displacement of the second travel motor 33*b*. The second motor displacement control device 35*b* includes a second motor cylinder 353 and a second motor control valve 354. The configuration of the second motor displacement control device 35*b* is the same as that of the first motor displacement control device 35a and a detailed explanation is omitted.

The travel motors 33a and 33b are connected to a drive shaft 37. The drive shaft 37 is connected to the abovementioned traveling wheels 4 by unillustrated axles. The rotation of the travel motors 33a and 33b is transmitted to the traveling wheels 4 through the drive shaft 37. As a result, the work vehicle 1 travels.

The HST 23 includes a clutch 54 and a clutch control valve 55. The clutch 54 is disposed between the first travel motor 33a and the drive shaft 37. The clutch 54 is switched between an engaged state and a disengaged state. The clutch 54 connects the first travel motor 33a and the drive shaft 37 in the engaged state. Consequently, the rotation of the first travel motor 33a and the rotation of the second travel motor 33b are both transmitted to the drive shaft 37. The clutch 54 disconnects the first travel motor 33a and the drive shaft 37 in the disengaged state. Consequently, the rotation of the first travel motor 33a is not transmitted to the drive shaft 37, and the rotation of the second travel motor 33b is transmitted to the drive shaft 37.

The clutch control valve 55 controls the pressure of the hydraulic fluid supplied to an oil chamber of the clutch 54. The clutch control valve 55 is also an electromagnetic proportional control valve, for example, and controls the pressure of the hydraulic fluid supplied to the oil chamber of the clutch 54 in response to an inputted signal. The clutch control valve 55 may be a pressure proportional control valve controlled in response to an inputted pilot pressure. The pressure of the hydraulic fluid supplied to the oil chamber of the clutch 54 is controlled by the clutch control valve 55, whereby the clutch 54 is switched between the engaged state and the disengaged state.

A vehicle speed sensor 36 is provided in the work vehicle 1. The vehicle speed sensor 36 detects the vehicle speed. The vehicle speed sensor 36 outputs a signal which indicates the vehicle speed. For example, the vehicle speed sensor 36 detects the vehicle speed by detecting the rotation speed of the drive shaft 37.

The HST 23 includes a charge pump 38 and a charge circuit 39. The charge pump 38 is a fixed displacement hydraulic pump. The charge pump 38 is connected to the engine 21. The charge pump 38 is driven by the engine 21 whereby hydraulic fluid is supplied to the drive hydraulic circuit 32 through the charge circuit 39.

The charge circuit 39 is connected to the charge pump 38. The charge circuit 39 is connected to the first drive circuit 32a via a first check valve 41. The charge circuit 39 is connected to the second drive circuit 32b via a second check valve 42.

The charge circuit 39 is connected to the first drive circuit 32a via a first relief valve 43. The first relief valve 43 is opened when the hydraulic pressure in the first drive circuit 32a exceeds a predetermined relief pressure. The charge circuit 39 is connected to the second drive circuit 32b via a second relief valve 44. The second relief valve 44 is opened when the hydraulic pressure in the second drive circuit 32b exceeds a predetermined relief pressure.

A charge relief valve 40 is provided in the charge circuit 39. The charge relief valve 40 is opened when the hydraulic pressure in the charge circuit 39 exceeds a predetermined relief pressure. As a result, the hydraulic pressure in the charge circuit 39 is controlled so as not to exceed the predetermined relief pressure.

A pump displacement control device 45 is connected to the travel pump 31. The pump displacement control device 45 controls the displacement of the travel pump 31. The displacement of the hydraulic pump signifies a discharge amount (cc/rev) of hydraulic fluid per one rotation. In addition, the pump displacement control device 45 controls the discharge direction of the travel pump 31. The pump displacement control device 45 includes a pump control cylinder 46 and a pump control valve 47.

The pump control cylinder 46 is connected to the travel pump 31. The pump control cylinder 46 is driven by hydraulic pressure and changes the tilt angle of the travel pump 31. As a result, the pump control cylinder 46 changes the displacement of the travel pump 31. The pump control cylinder 46 is connected to the charge circuit 39 through a pump pilot circuit 48.

The pump control valve 47 is an electromagnetic proportional control valve controlled based on an instruction signal inputted to the pump control valve 47. The pump control valve 47 switches the supply direction of the hydraulic fluid to the pump control cylinder 46. The pump control valve 47 switches the discharge direction of the travel pump 31 by switching the supply direction of the hydraulic fluid to the pump control cylinder 46. Consequently, the drive directions of the travel motors 33a and 33b are changed and the work vehicle 1 is switched between forward travel and reverse travel.

In addition, the pump control valve 47 controls the pressure of hydraulic fluid supplied through the pump pilot circuit 48 to the pump control cylinder 46. Specifically, the pump control valve 47 changes the pressure of the hydraulic fluid supplied to the pump control cylinder 46, thereby adjusting the tilt angle of the travel pump 31. Consequently, the displacement of the travel pump 31 is controlled.

The pilot pump circuit 48 is connected to a hydraulic fluid tank via a relief valve 52. A pilot port of the relief valve 52 is connected to the first drive circuit 32a and the second drive circuit 32b through a shuttle valve 53. The shuttle valve 53 introduces the largest of the hydraulic pressure of the first drive circuit 32a and the hydraulic pressure of the second drive circuit 32b (referred to below as "drive circuit pressure") to the pilot port of the relief valve 52.

The relief valve 52 causes the pump pilot circuit 48 to be in communication with to the hydraulic fluid tank when the drive circuit pressure is equal to or greater than a predetermined cutoff pressure. Consequently, the hydraulic pressure of the pump pilot circuit 48 is lowered whereby the displacement of the travel pump 31 is reduced. As a result, an increase in the drive circuit pressure is suppressed.

Figure 4:
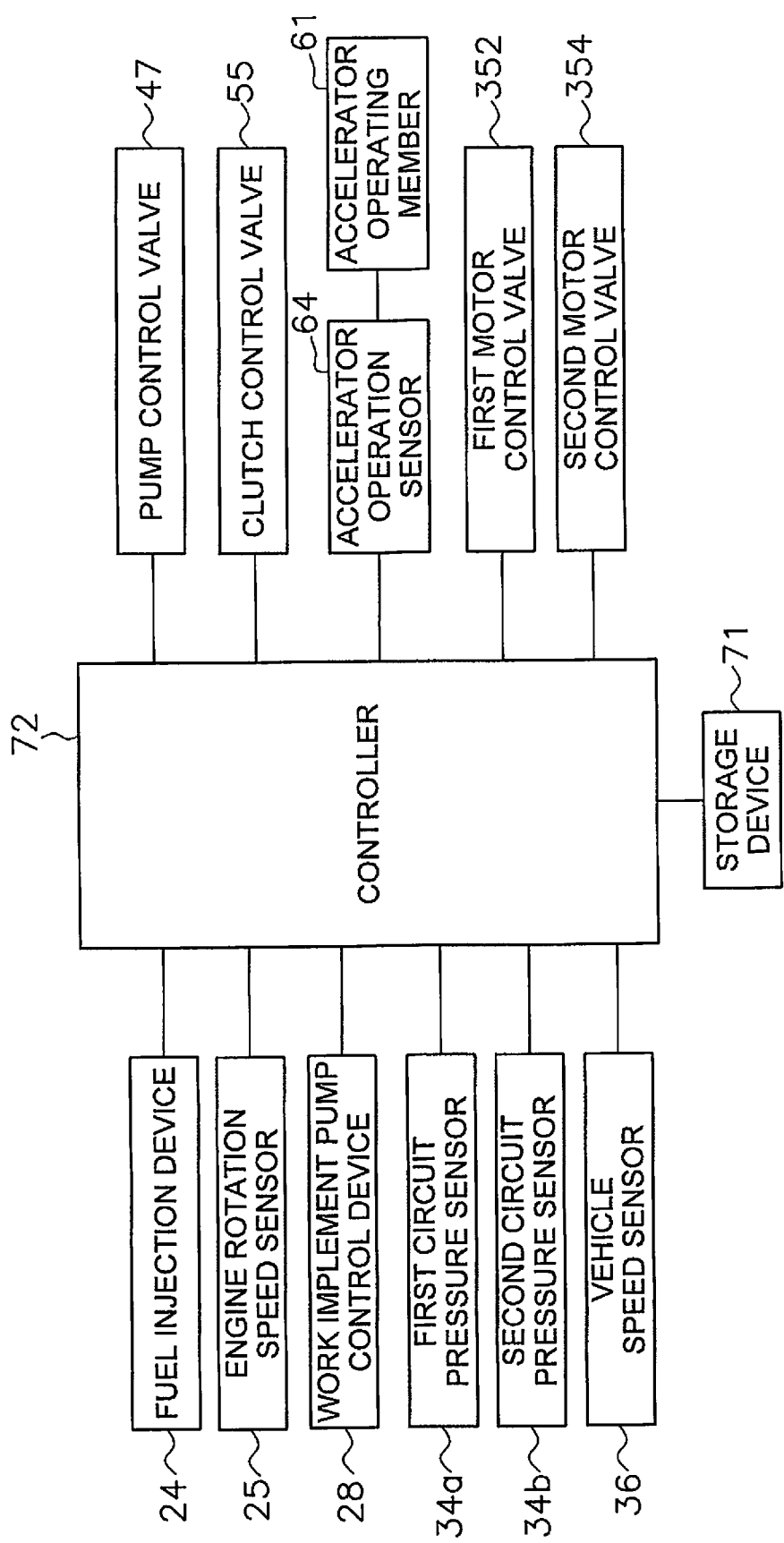
FIG. 4 is a block diagram illustrating a configuration of a control system of the work vehicle.

FIG. 4 is a schematic view illustrating the control system of the work vehicle 1. As illustrated in FIG. 4, the work vehicle 1 includes an accelerator operating member 61. The accelerator operating member 61 is disposed in a manner that enables operation by an operator. The accelerator operating member 61 is disposed inside the cab 5.

The accelerator operating member 61 is, for example, an accelerator pedal. However, the accelerator operating member 61 may be another member such as a lever or a switch. The accelerator operating member 61 is connected to an accelerator operation sensor 64. The accelerator operation sensor 64 is, for example, a positional sensor for detecting the position of the accelerator operating member 61. The accelerator operation sensor 64 outputs a signal indicative of the operating amount (referred to below as "accelerator operating amount") of the accelerator operating member 61. The accelerator operating amount is expressed, for example, by a percentage where the state of the accelerator operating member 61 being operated to fully open is set to 100%. As described below, the operator is able to control the vehicle speed and the tractive force by adjusting the accelerator operating amount.

As illustrated in FIG. 4, the work vehicle 1 includes a storage device 71 and a controller 72. The storage device 71 includes, for example, a memory and an auxiliary storage device. The storage device 71 may be a RAM or a ROM, for example. The storage device 71 may be a semiconductor memory or a hard disk memory and the like. The storage device 71 is an example of a non-transitory computer-readable recording medium. The storage device 71 records computer instructions executable by a processor for controlling the work vehicle 1.

The controller 72 includes, for example, the processor such as a CPU. The controller 72 is communicably connected to the abovementioned sensors and the storage device 71. The controller 72 is communicably connected by wire or wirelessly to the various abovementioned sensors and the storage device 71. The controller 72 acquires various types of data by receiving signals from the sensors and the storage device 71. The controller 72 is programmed to control the work vehicle 1 based on the acquired data. The controller 72 may also be configured from a plurality of controllers separate from each other.

The controller 72 is communicably connected by wire or wirelessly to the abovementioned control valves 352, 354, 47 and 55, and to the fuel injection device 24. The controller 72 controls the control valves 352, 354, 47 and 55, and the fuel injection device 24 by outputting instruction signals to the control valves 35a, 35b, 47 and 55, and the fuel injection device 24.

Specifically, the controller 72 controls the engine torque and the engine rotation speed by outputting instruction signals to the fuel injection device 24. The controller 72 controls the displacement of the first travel motor 33a by outputting instruction signals to the first motor control valve 352. The controller 72 controls the displacement of the second travel motor 33b by outputting instruction signals to the second motor control valve 354. The controller 72 controls the displacement of the travel pump 31 by outputting instruction signals to the pump control valve 47. The controller 72 controls the switching of the clutch 54 by outputting instruction signals to the clutch control valve 55.

Figure 5:
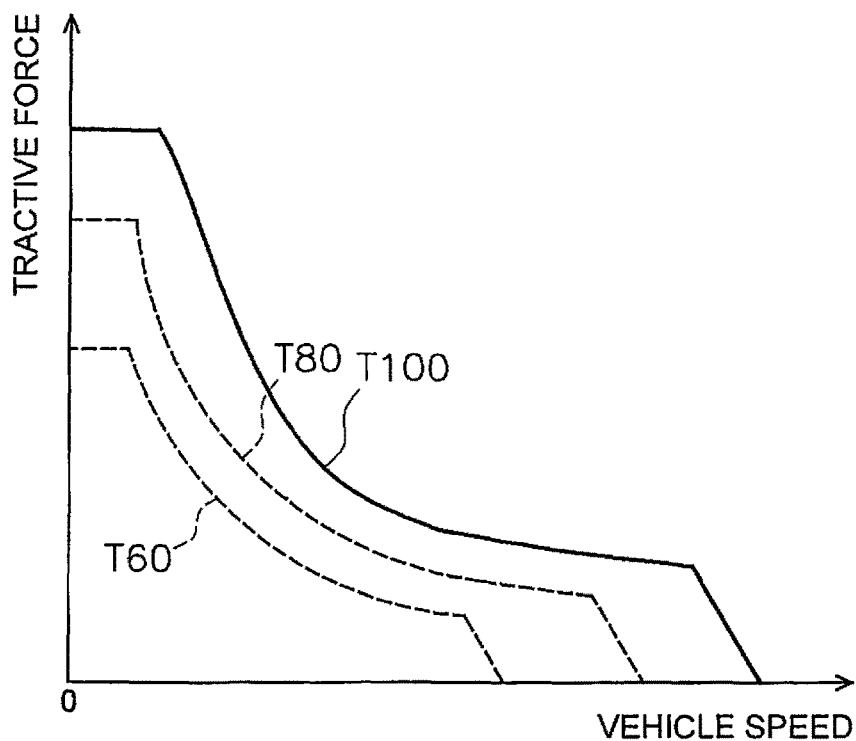
FIG. 5 illustrates vehicle speed—tractive force characteristics of the work vehicle.

The controller 72 controls the displacement of the travel pump 31 and the displacements of the travels motors 33a and 33b and controls the HST 23 so that the vehicle speed—tractive force characteristics as illustrated in FIG. 5 are realized. FIG. 5 illustrates an example of vehicle speed—tractive force characteristics which are changed in response to the operation of the accelerator operating member 61 by the operator. T100 in FIG. 5 represents the vehicle speed—tractive force characteristics when the accelerator operating amount is 100%. T80 represents the vehicle speed—tractive force characteristics when the accelerator operating amount is 80%. T60 represents the vehicle speed—tractive force characteristics when the accelerator operating amount is 60%.

Figure 6:
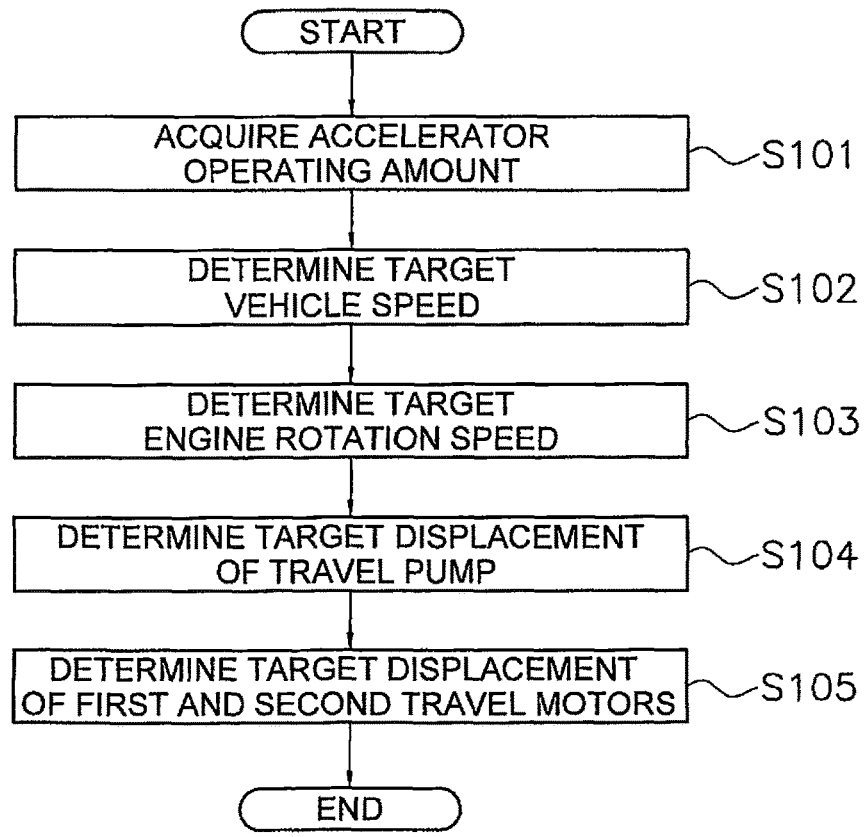
FIG. 6 is a flow chart illustrating processing executed by a controller.

Processing executed by the controller 72 will be explained below. FIG. 6 is a flow chart illustrating processing executed by the controller 72. The following explanation pertains to control when the work vehicle 1 is traveling forward. However, the same controls may be performed when the work vehicle 1 is traveling in reverse.

As illustrated in FIG. 6, the controller 72 acquires the accelerator operating amount in S101. The controller 72 acquires the accelerator operating amount with signals from the accelerator operation sensor 64.

Figure 7:
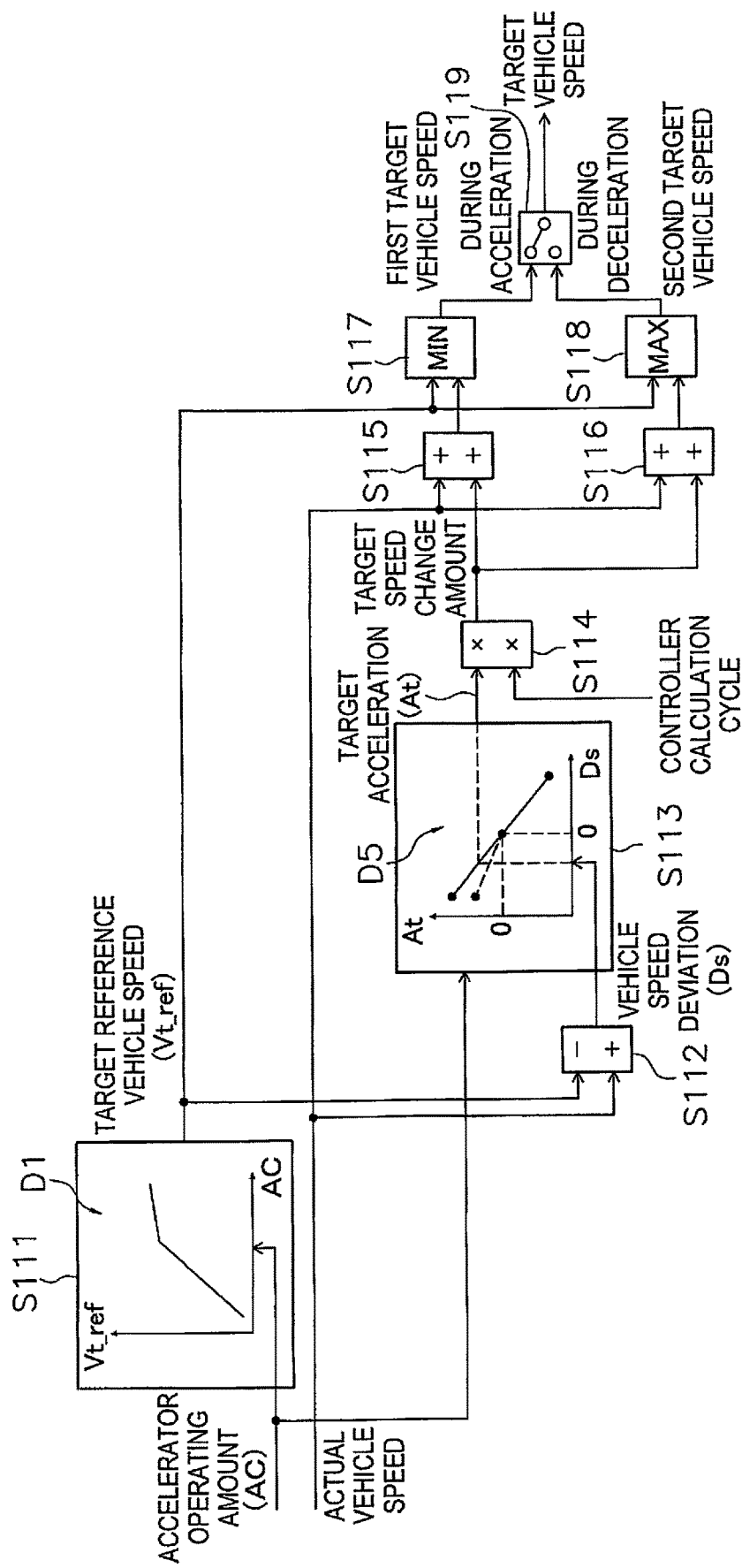
FIG. 7 illustrates processing for determining a target vehicle speed.

In step S102, the controller 72 determines a target vehicle speed. The controller 72 determines the target vehicle speed based on the accelerator operating amount. FIG. 7 illustrates processing for determining the target vehicle speed based on the accelerator operating amount.

As illustrated in FIG. 7 in step S111, the controller 72 determines a target reference vehicle speed from the accelerator operating amount. The target reference vehicle speed is a vehicle speed set as a target attainment vehicle speed when the work vehicle 1 is traveling on level ground. The storage device 71 stores reference vehicle speed data D1 which stipulates the relationship between the accelerator operating amount and the target reference vehicle speed. In the reference vehicle speed data D1, the target reference vehicle speed increases in accordance with an increase in the accelerator operating amount. The controller 72 refers to the target vehicle speed data D1 and determines the target reference vehicle speed corresponding to the accelerator operating amount.

In step S112, the controller 72 calculates a vehicle speed deviation. The vehicle speed deviation is the difference between the target reference vehicle speed and the actual vehicle speed. In step S113, the controller 72 calculates a target acceleration. The controller 72 calculates the target acceleration from the vehicle speed deviation and the accelerator operating amount. Specifically, the controller 72 refers to acceleration data D5 and calculates the target acceleration corresponding to the vehicle speed deviation. The acceleration data D5 stipulates the relationship between the vehicle speed deviation and the target acceleration. In the acceleration data D5, the target acceleration decreases in response to an increase in the vehicle speed deviation. The controller 72 changes the acceleration data D5 in accordance with the accelerator operating amount. The controller 72 changes the acceleration data D5 so that even when the vehicle speed deviation is the same, the target acceleration increases in correspondence to an increase in the accelerator operating amount. The vehicle speed deviation being a negative value signifies that the work vehicle 1 is accelerating. The vehicle speed deviation being a positive value signifies that the work vehicle 1 is decelerating. The target acceleration being a positive value signifies acceleration and the target acceleration being a negative value signifies deceleration.

In step S114, the controller 72 calculates the target speed change amount from the target acceleration. The controller 72 calculates the target speed change amount by multiplying the target acceleration by the calculation cycle of the controller 72.

In step S115 and step S116, the controller 72 adds the target speed change amount to the actual vehicle speed. In step S117, the controller 72 selects the lesser (first target vehicle speed) of the value derived by adding the target speed change amount to the actual vehicle speed, and the target reference vehicle speed. In step S118, the controller 72 selects the greater (second target vehicle speed) of the value derived by adding the target speed change amount to the actual vehicle speed, and the target reference vehicle speed In step S119, the controller 72 determines the target vehicle speed in accordance with whether the work vehicle 1 is accelerating or decelerating. The controller 72 determines that the work vehicle 1 is accelerating when the actual vehicle speed is smaller than the target reference vehicle speed. In addition, the controller 72 determines that the work vehicle 1 is decelerating when the actual vehicle speed is greater than the target reference vehicle speed. The controller 72 determines that the first target vehicle speed is the target vehicle speed during acceleration, and determines that the second target vehicle speed is the target vehicle speed during deceleration. When the target vehicle speed is a negative value, the controller 72 sets the target vehicle speed to zero.

Figure 8:
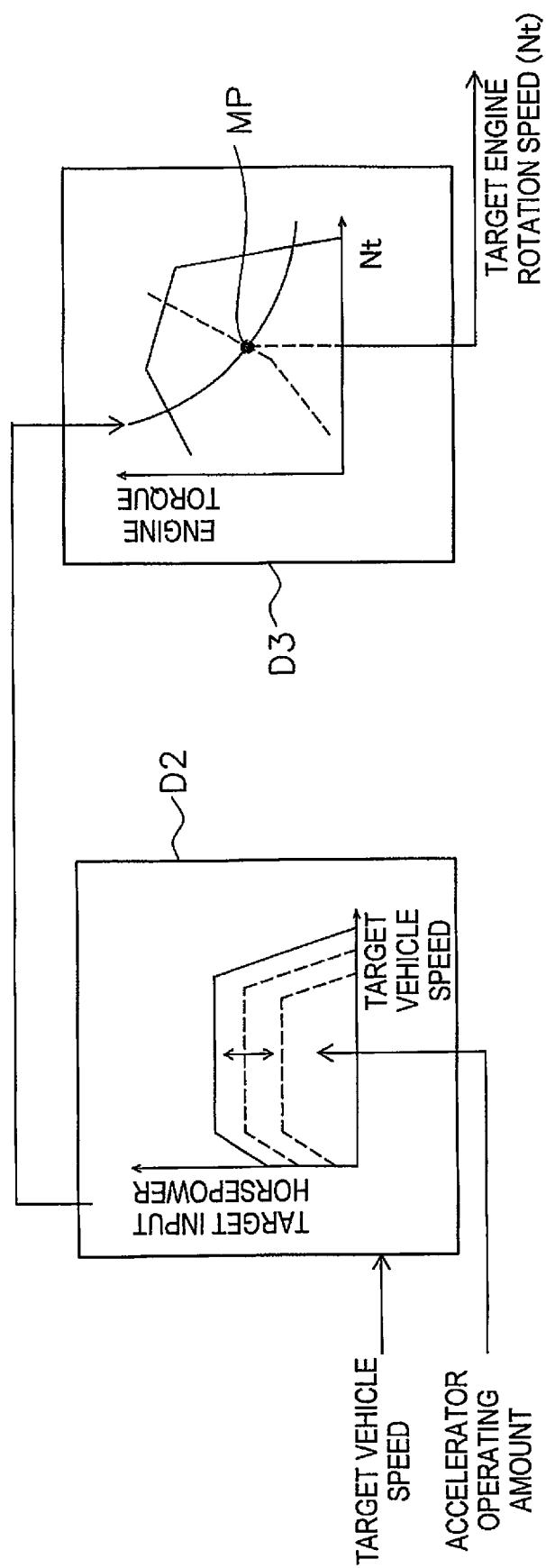
FIG. 8 illustrates processing for determining a target engine rotation speed.

In step S103, the controller 72 determines a target engine rotation speed. The controller 72 determines the target engine rotation speed in accordance with the accelerator operating amount and the vehicle speed. Specifically as illustrated in FIG. 8, the controller 72 determines a target input horsepower in accordance with the accelerator operating amount and the target vehicle speed. The storage device 71 stores target input horsepower data D2 which represents the relationship between the target vehicle speed, the accelerator operating amount, and the target input horsepower. The controller 72 refers to the target input horsepower data D2 and determines the target input horsepower from the accelerator operating amount and the target vehicle speed so that target vehicle speed—target input horsepower characteristics in accordance with the accelerator operating amount are achieved.

The controller 72 determines the target engine rotation speed from the target input horsepower. The storage device 71 stores engine torque—rotation speed data D3 which stipulates the relationship between the engine torque and the target engine rotation speed. The controller 72 refers to the engine torque—rotation speed data D3 and determines the target engine rotation speed corresponding to the target input horsepower. The controller 72 determines the target engine rotation speed so that the engine torque and the absorption torque of the travel pump 31 match each other at a predetermined matching point MP on an equivalent horsepower line corresponding to the target input horsepower. The controller 72 controls the fuel injection device 24 in accordance with the target engine rotation speed and the load with an all-speed governor method. Specifically, the controller 72 outputs instruction signals to the fuel injection device 24 so as to arrive at an engine rotation speed in accordance with the load on a regulation line in accordance with the accelerator operating amount.

Figure 9A:
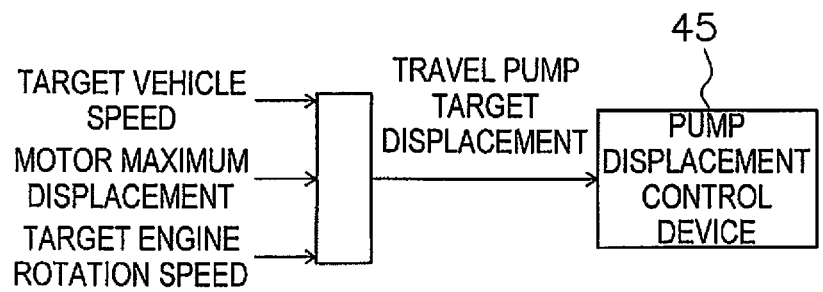
FIG. 9A and FIG. 9B illustrate processing for determining the target displacement of a travel pump and the target displacement of a travel motor.

Next in step S104, the controller 72 determines the target displacement of the travel pump 31. As illustrated in FIG. 9A, the controller 72 determines the target displacement of the travel pump 31 from the target vehicle speed, the maximum displacement of the travel motors 33a and 33b, and the target engine rotation speed. Specifically, the controller 72 calculates the flow rates of the travel motors 33a and 33b for achieving the target vehicle speed from the target vehicle speed and the maximum displacement of the travel motors 33a and 33b, and calculates the target displacement of the travel pump 31 from the flow rates of the travel motors 33a and 33b and the target engine rotation speed. The controller 72 outputs an instruction signal indicative of the target displacement of the travel pump 31 to the pump displacement control device 45.

As indicated below, the work vehicle 1 switches between travel with two motors and travel with one motor in accordance with the vehicle speed. The abovementioned maximum displacement of the travel motors 33a and 33b is the sum of the maximum displacement of the first travel motor 33a and the maximum displacement of the second travel motor 33b when traveling with two motors. The abovementioned maximum displacement of the travel motors 33a and 33b is the maximum displacement of the second travel motor 33b when traveling with one motor.

Figure 9B:
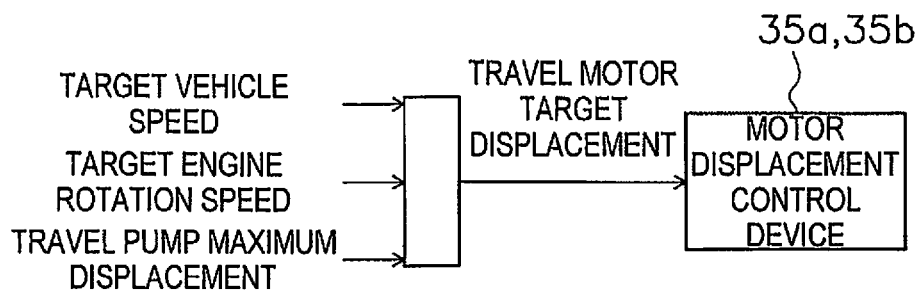

In step S105, the controller 72 determines the target displacement of the travel motors 33a and 33b. As illustrated in FIG. 9B, the controller 72 determines the target displacement of the travel motors 33a and 33b from the target vehicle speed, the target engine rotation speed, and the maximum displacement of the travel pump 31. Specifically, the controller 72 determines the flow rate of the travel pump 31 from the target engine rotation speed and the maximum displacement of the travel pump 31. The controller 72 calculates, from the target vehicle speed, the rotation speeds of the travel motors 33a and 33b for achieving the target vehicle speed. The controller 72 calculates the target displacement of the travel motors 33a and 33b from the flow rate of the travel pump 31 and the rotation speeds of the travel motors 33a and 33b. The controller 72 outputs instruction signals indicative of the target displacement of the travel motors 33a and 33b to the first motor displacement control device 35a and the second motor displacement control device 35b.

The switching control of the clutch 54 executed by the controller 72 will be explained next. The controller 72 maintains the clutch 54 in the engaged state when the vehicle speed is less than a predetermined switching threshold. Consequently, the work vehicle 1 travels with two motors with the first travel motor 33a and the second travel motor 33b. The controller 72 switches the clutch 54 from the engaged state to the disengaged state when the vehicle speed increases and reaches the switching threshold. The controller 72 then maintains the clutch in the disengaged state while the vehicle speed is equal to or greater than the switching threshold. Consequently, the work vehicle 1 travels with one motor with only the second travel motor 33b. The processing executed by the controller 72 during the switching control is explained below.

Figure 10:
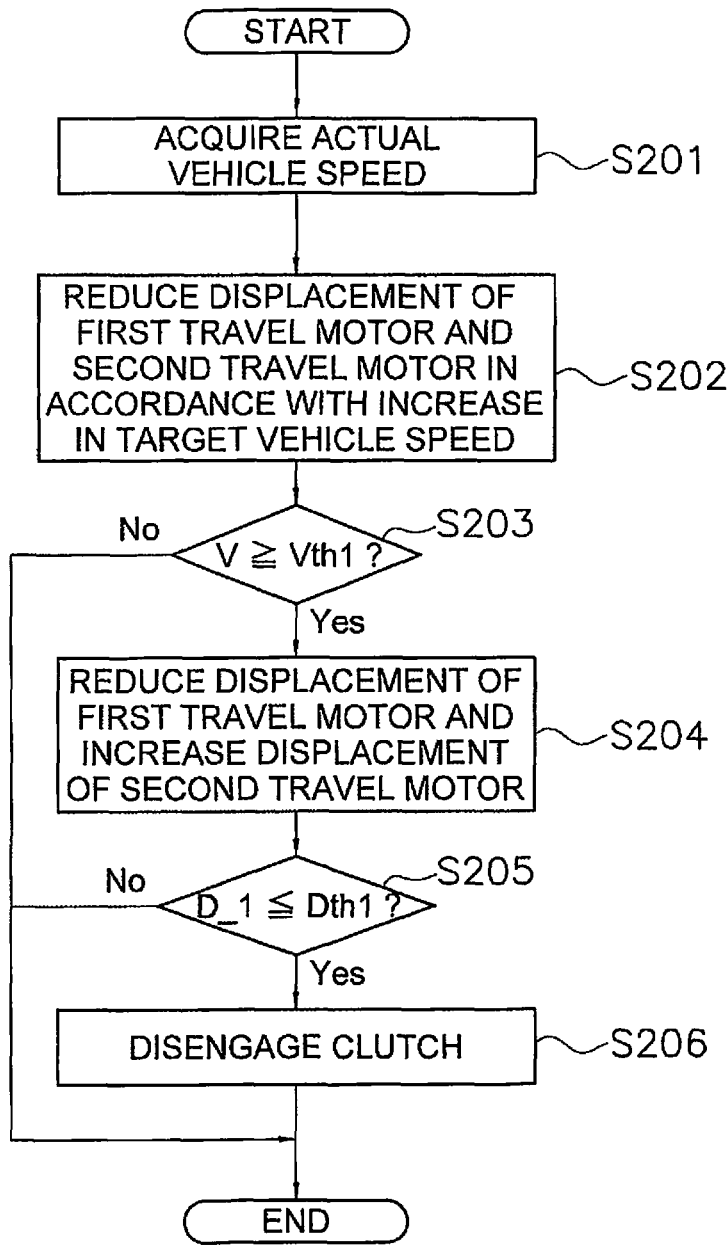
FIG. 10 is a flow chart illustrating processing for a control according to a first embodiment.
Figure 11:
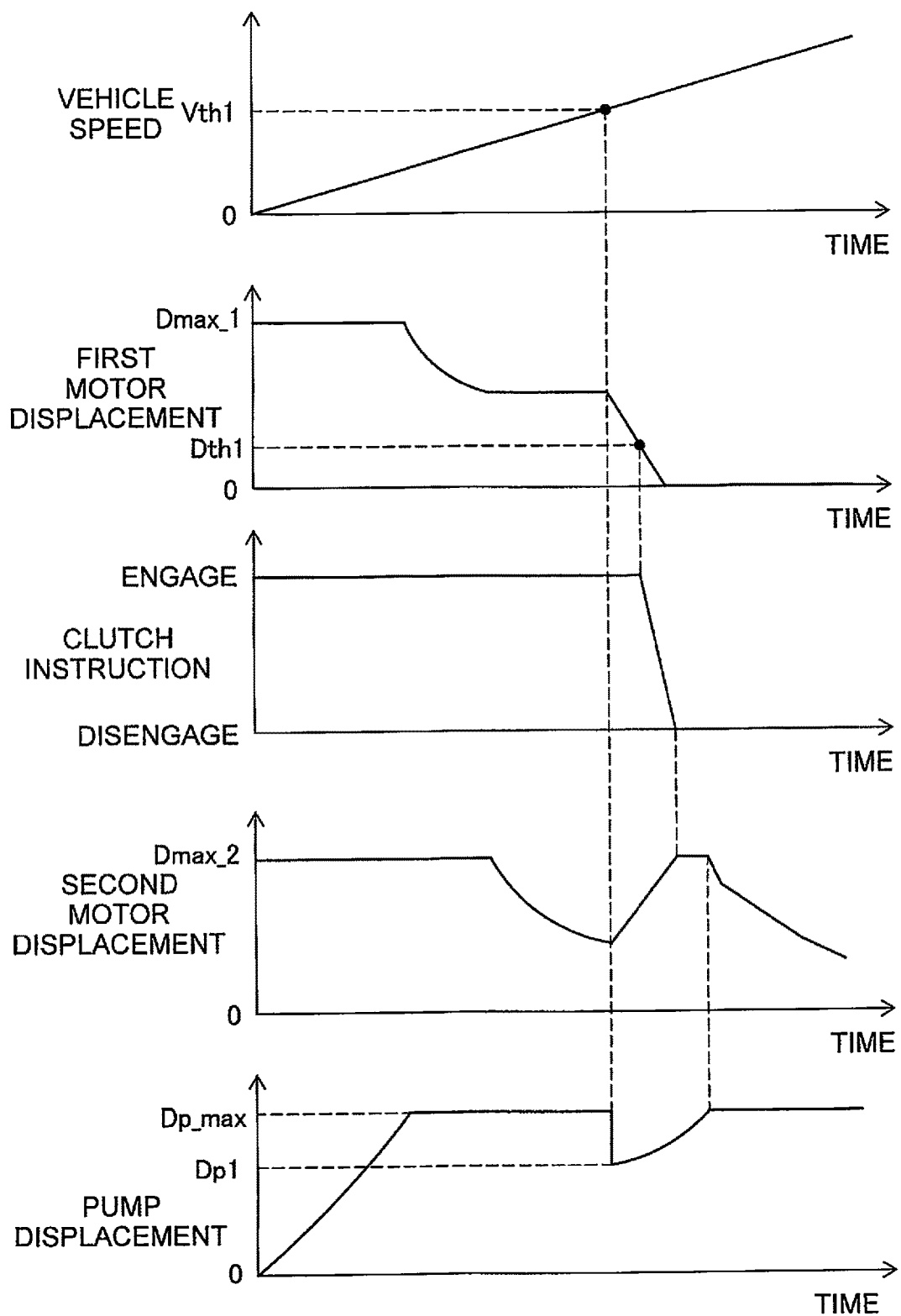
FIG. 11 is a timing chart illustrating processing according to the first embodiment.

FIG. 10 is a flow chart illustrating processing according to a first embodiment executed by the controller 72. FIG. 11 is a timing chart illustrating processing according to the first embodiment executed by the controller 72. The following explanation depicts processing when the work vehicle 1 begins to travel from the stopped state and the vehicle speed increases, whereby the travel with two motors is switched to the travel with one motor.

In step S201, the controller 72 acquires the actual vehicle speed of the work vehicle 1. The controller 72 acquires the actual vehicle speed of the work vehicle 1 with signals from the vehicle speed sensor 36.

As illustrated in FIG. 11, the clutch 54 is in the engaged state when the work vehicle begins to travel from the vehicle speed of zero. The displacement of the first travel motor 33a is maximum displacement Dmax_1, and the displacement of the second travel motor 33b is maximum displacement Dmax_2. As illustrated in FIG. 9A, the controller 72 determines the displacement of the travel pump 31 in accordance with the target vehicle speed. Therefore, the displacement of the travel pump 31 increases from zero to maximum displacement Dp_max in accordance with an increase in the target vehicle speed. Consequently, the transmission gear ratio of the HST becomes smaller in accordance with the increase in the vehicle speed.

In step S202, the controller 72 reduces the displacement of the first travel motor 33a and the second travel motor 33b in accordance with the increase in the target vehicle speed. As illustrated in FIG. 9B, the controller 72 determines the displacement of the first travel motor 33a and the displacement of the second travel motor 33b in accordance with the target vehicle speed. Therefore, as illustrated in FIG. 11, the controller 72 gradually reduces the displacement of the first travel motor 33a from the maximum displacement Dmax_1 in accordance with the increase in the target vehicle speed.

Additionally, the controller 72 gradually reduces the displacement of the second travel motor 33b from the maximum displacement Dmax_2 in accordance with the increase in the target vehicle speed. As a result, the transmission gear ratio of the HST 23 becomes smaller in accordance with the increase in the vehicle speed. However, the controller 72 reduces the target engine rotation speed more than a value in accordance with the accelerator operating amount in response to the reduction in the displacement of the second travel motor 33b. The controller 72 reduces the target engine rotation speed more than the value in accordance with the accelerator operating amount so as to offset the increment of the vehicle speed due to the reduction of the displacement of the second travel motor 33b.

In step S203, the controller 72 determines whether the actual vehicle speed V has reached the switching threshold Vth1. The processing advances to step S204 when the actual vehicle speed V reaches the switching threshold Vth1.

In step S204, the controller 72 reduces the displacement of the first travel motor 33a and increases the displacement of the second travel motor 33b. As illustrated in FIG. 11, the controller 72 reduces the displacement of the first travel motor 33a so that the displacement becomes zero. In addition, the controller 72 increases the displacement of the second travel motor 33b so as to offset the flow rate excess in the drive hydraulic circuit 32 in accordance with the reduction in the displacement of the first travel motor 33a.

Specifically, the controller 72 calculates a reduction amount of the displacement of the first travel motor 33a. The controller 72 converts the reduction amount of the displacement of the first travel motor 33a to a value equivalent to the displacement of the second travel motor 33b and adds said value to the target displacement of the second travel motor 33b thereby compensating the target displacement of the second travel motor 33b. The controller 72 outputs an instruction signal indicative of the compensated target displacement to the second motor displacement control device 35b. Consequently, the second motor displacement control device 35b increases the displacement of the second travel motor 33b so as to offset the flow rate excess in the drive hydraulic circuit 32 in accordance with the reduction of the displacement of the first travel motor 33a.

In step S205, the controller 72 determines whether the displacement D_1 of the first travel motor 33a has reached a predetermined displacement threshold Dth1. The processing advances to step S206 when the displacement D_1 of the first travel motor 33a has reached the displacement threshold Dth1.

In step S206, the controller 72 switches the clutch 54 from the engaged state to the disengaged state. As illustrated in FIG. 11, when the displacement D_1 of the first travel motor 33a is reduced and reaches the displacement threshold Dth1, the controller 72 switches the clutch 54 from the engaged state to the disengaged state. Consequently, the work vehicle 1 is switched from travel with two motors to travel with one motor. The displacement of the travel pump 31 in the period until the switching of the clutch 54 is complete may be reduced to a predetermined displacement Dp1 that is smaller than the maximum displacement Dp_max.

As described above, the work vehicle 1 travels with one motor when the vehicle speed is equal to or greater than the switching threshold Vth1. The controller 72 reduces the displacement of the second travel motor 33b in accordance with an increase in the target vehicle speed. As a result, the transmission gear ratio of the HST 23 becomes smaller in accordance with the increase in the vehicle speed.

In the control according to the first embodiment explained above, the displacement of the first travel motor 33a is reduced and the displacement of the second travel motor 33b is increased so that the flow rate excess is offset in the drive hydraulic circuit 32 in accordance with the reduction in the displacement of the first travel motor 33a during the switching control of the clutch 54. As a result, the change in the flow rate of the hydraulic fluid in the drive hydraulic circuit 32 is minimized when the displacement of the first travel motor 33a is reduced. As a result, the occurrence of speed change shock can be suppressed.

Figure 12:
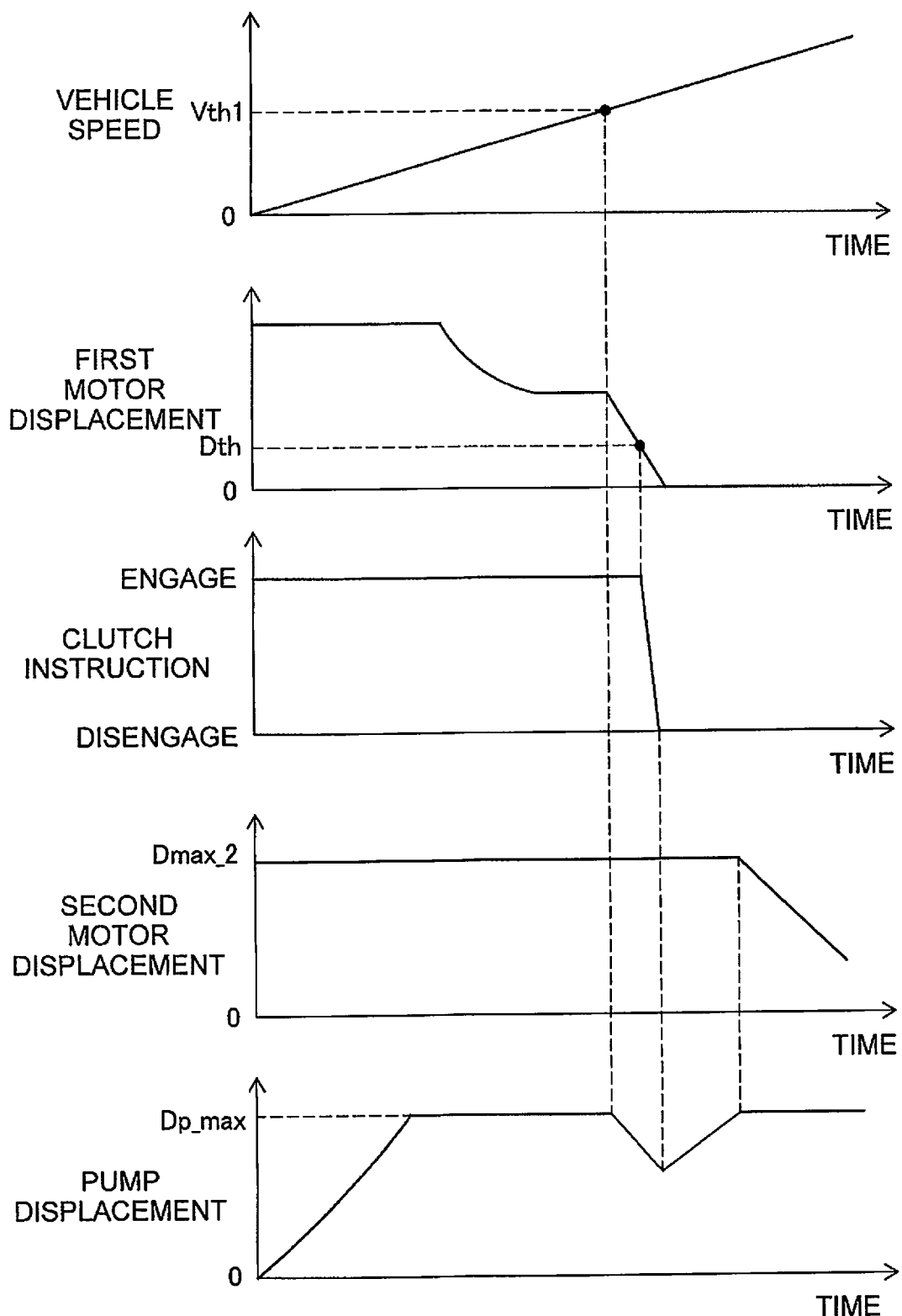
FIG. 12 is a timing chart illustrating processing according to a second embodiment.

Processing according to a second embodiment of the switching control of the clutch 54 will be explained next. FIG. 12 is a timing chart illustrating processing according to the second embodiment. In the processing according to the second embodiment, the controller 72 reduces the displacement of the travel pump 31 instead of increasing the displacement of the second travel motor 33b in the abovementioned step S204.

As illustrated in FIG. 12, the controller 72 reduces the displacement of the first travel motor 33a to zero and reduces the displacement of the travel pump 31 so as to offset the flow rate excess in the drive hydraulic circuit 32 in accordance with the reduction of the displacement of the first travel motor 33a.

Specifically, the controller 72 calculates the flow rate excess in the drive hydraulic circuit 32 in accordance with the reduction in the displacement of the first travel motor 33a. The controller 72 converts the flow rate excess to a value that corresponds to the displacement of the travel pump 31 and subtracts said value from the target displacement (maximum displacement Dp_max) of the travel pump 31, thereby compensating the target displacement of the travel pump 31. The controller 72 outputs an instruction signal which indicates the compensated target displacement to the pump displacement control device 45. Consequently, the pump displacement control device 45 reduces the displacement of the travel pump 31 so as to offset the flow rate excess in the drive hydraulic circuit 32 in accordance with the reduction in the displacement of the first travel motor 33a. As illustrated in FIG. 12, the controller 72 gradually increases the displacement of the travel pump 31 toward the maximum displacement Dp_max after reducing the displacement of the travel pump 31.

Figure 13:
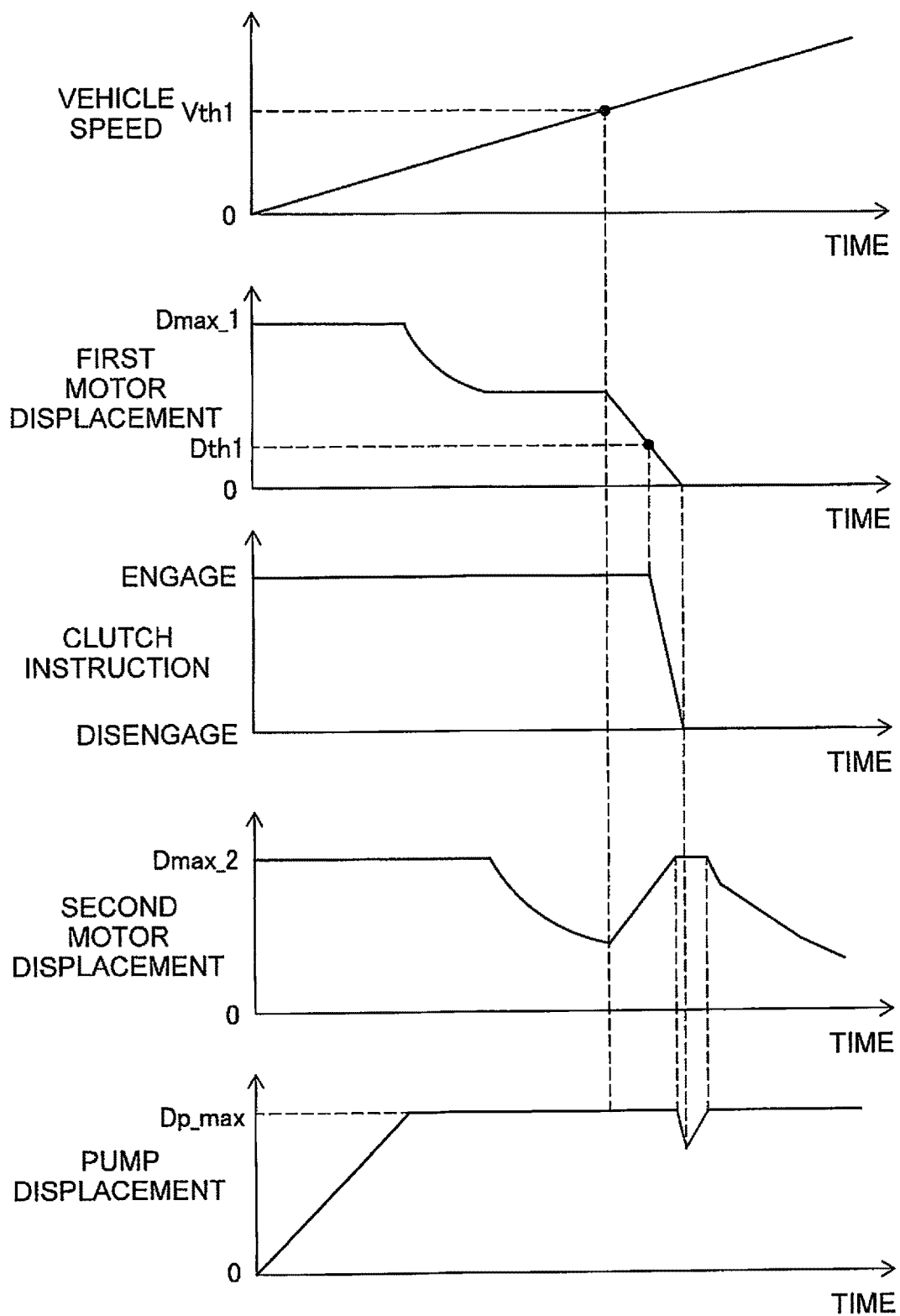
FIG. 13 is a timing chart illustrating processing according to a modified example of the second embodiment.

Alternatively, the controller 72 may reduce the displacement of the travel pump 31 in addition to increasing the displacement of the second travel motor 33b in the abovementioned step S204. Specifically as illustrated in FIG. 13, the controller 72 may reduce the displacement of the first travel motor 33a to zero and may increase the displacement of the second travel motor 33b and reduce the displacement of the travel pump 31 so as to offset the flow rate excess in the drive hydraulic circuit 32 in accordance with the reduction in the displacement of the first travel motor 33a. In this case, the controller 72 may offset the insufficient portion in the increase of the displacement of the second travel motor 33b by reducing the displacement of the travel pump 31.

Figure 14:
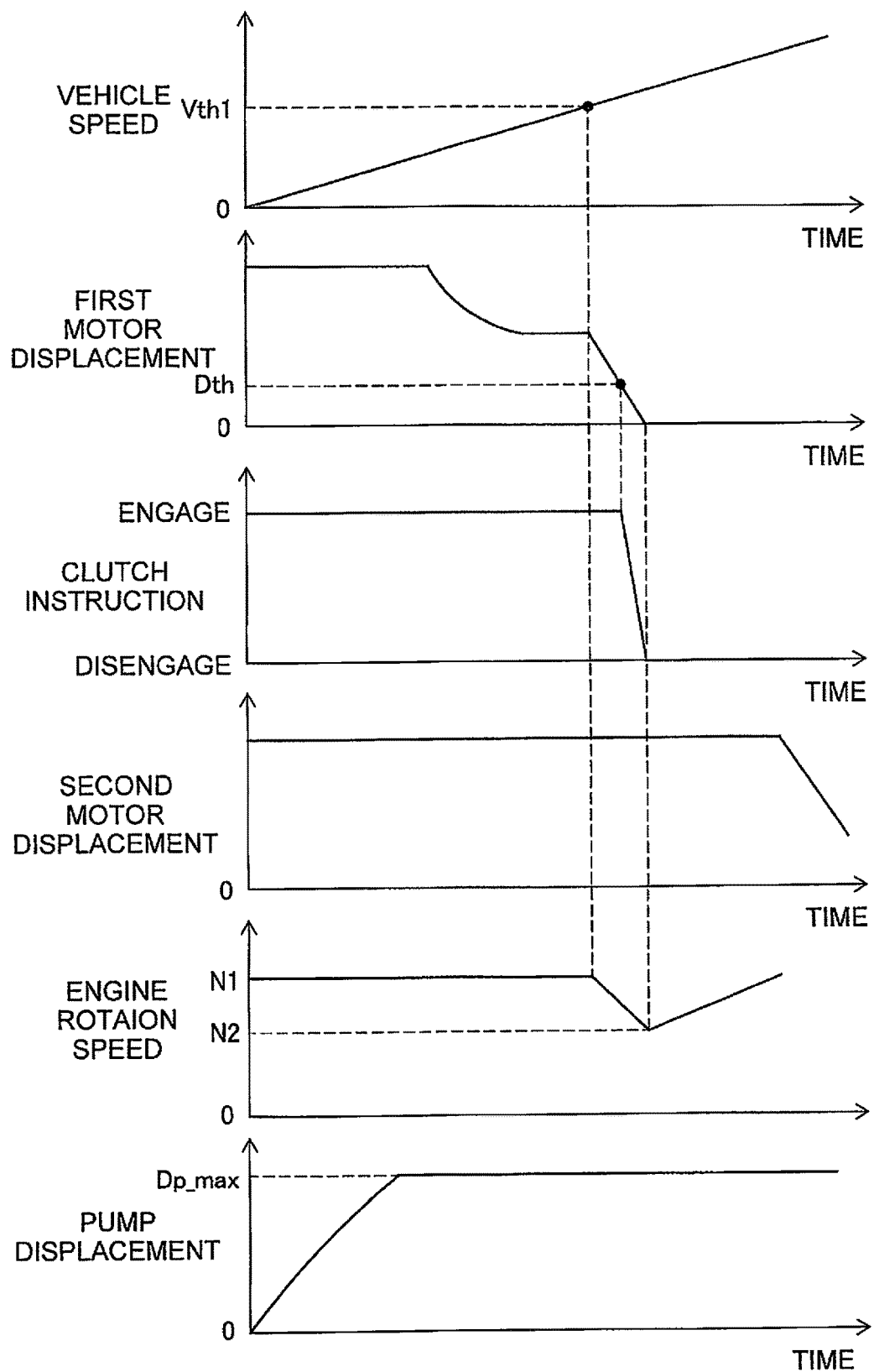
FIG. 14 is a timing chart illustrating processing according to a third embodiment.

Processing according to a third embodiment of the switching control of the clutch 54 will be explained next. FIG. 14 is a timing chart illustrating processing according to the third embodiment. In the processing according to the third embodiment, the engine rotation speed is reduced instead of increasing the displacement of the second travel motor 33b in the abovementioned step S204.

As illustrated in FIG. 14, the controller 72 reduces the displacement of the first travel motor 33a to zero and reduces the target engine rotation speed less than the target engine rotation speed N1 that corresponds to the accelerator operating amount, so as to offset the flow rate excess in the drive hydraulic circuit 32 in accordance with the reduction in the displacement of the first travel motor 33a.

Specifically, the controller 72 calculates the flow rate excess in the drive hydraulic circuit 32 in accordance with the reduction in the displacement of the first travel motor 33a. The controller 72 converts the flow rate excess to a value that corresponds to the engine rotation speed and lowers the target engine rotation speed from the target engine rotation speed N1 that corresponds to the accelerator operating amount, thereby compensating the target engine rotation speed. The controller 72 calculates a throttle instruction value from the compensated target engine rotation speed and outputs an instruction signal which indicates the throttle instruction value to the fuel injection device 24. Consequently, the fuel injection device 24 reduces the engine rotation speed so as to offset the flow rate excess in the drive hydraulic circuit 32 in accordance with the reduction in the displacement of the first travel motor 33a. As illustrated in FIG. 14, the controller 72 gradually increases the target engine rotation speed after reducing the target engine rotation speed from N1 that corresponds to the accelerator operating amount to N2.

Figure 15:
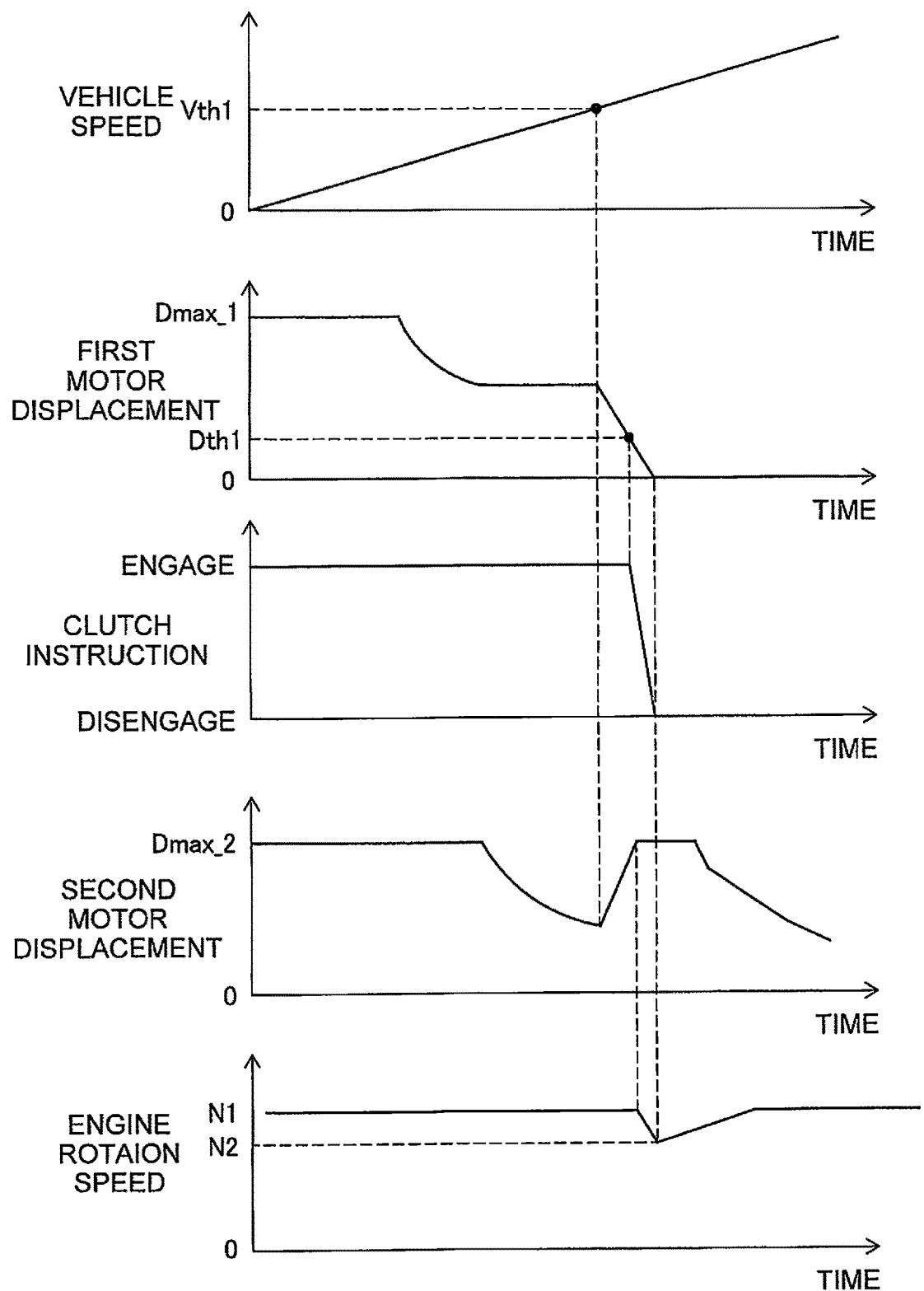
FIG. 15 is a timing chart illustrating processing according to a modified example of the third embodiment.

Alternatively, the controller 72 may reduce the engine rotation speed in addition to increasing the displacement of the second travel motor 33b in the abovementioned step S204. Specifically, as illustrated in FIG. 15, the controller 72 may reduce the displacement of the first travel motor 33a to zero, and may increase the displacement of the second travel motor 33b and reduce the target engine rotation speed less than the target engine rotation speed N1 which corresponds to the accelerator operating amount, so as to offset the flow rate excess in the drive hydraulic circuit 32 in accordance with the reduction in the displacement of the first travel motor 33a. In this case, the controller 72 may offset the insufficient portion in the increase of the displacement of the second travel motor 33 by reducing the engine rotation speed.

Figure 16:
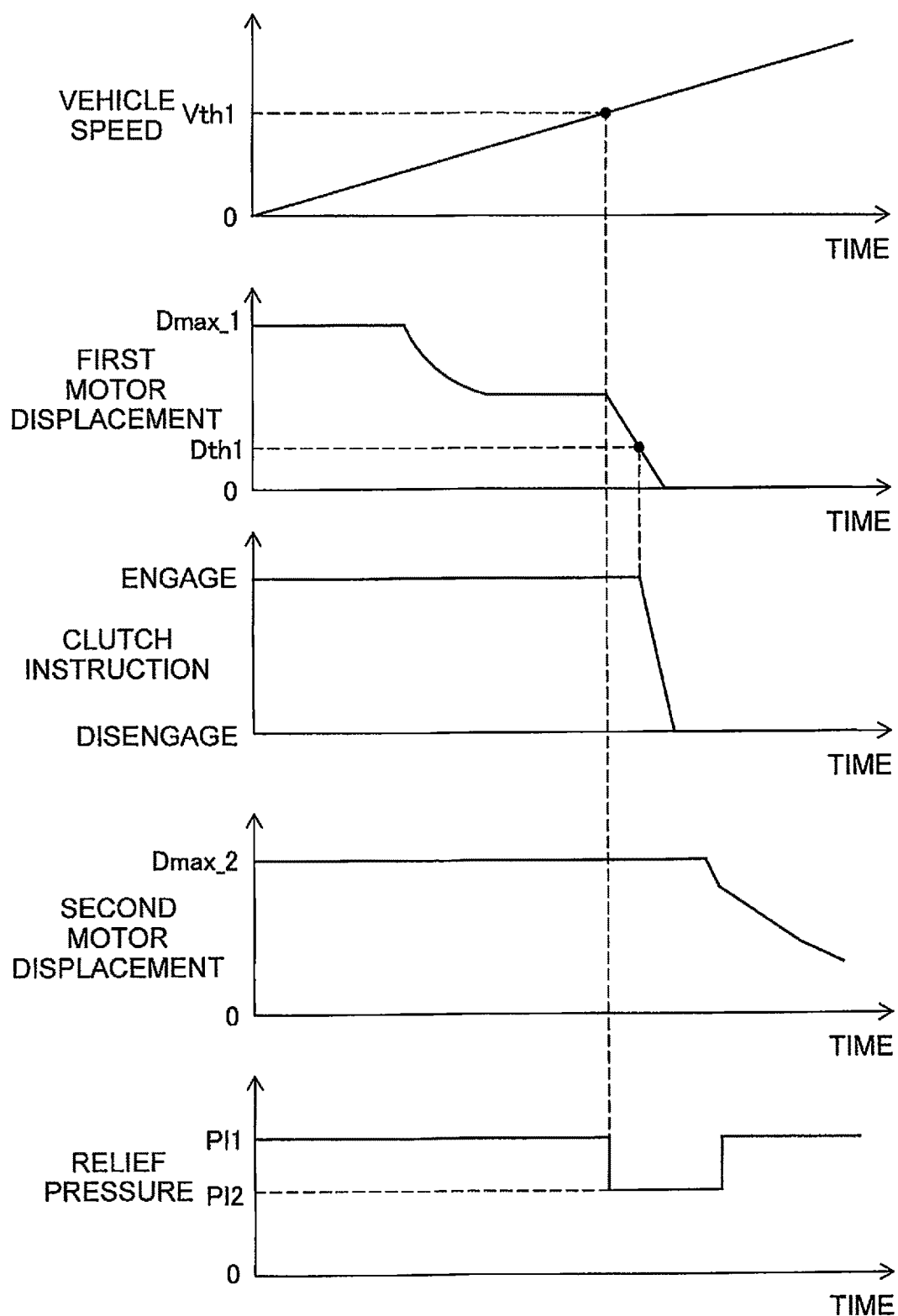
FIG. 16 is a timing chart illustrating processing according to a fourth embodiment.
Figure 17:
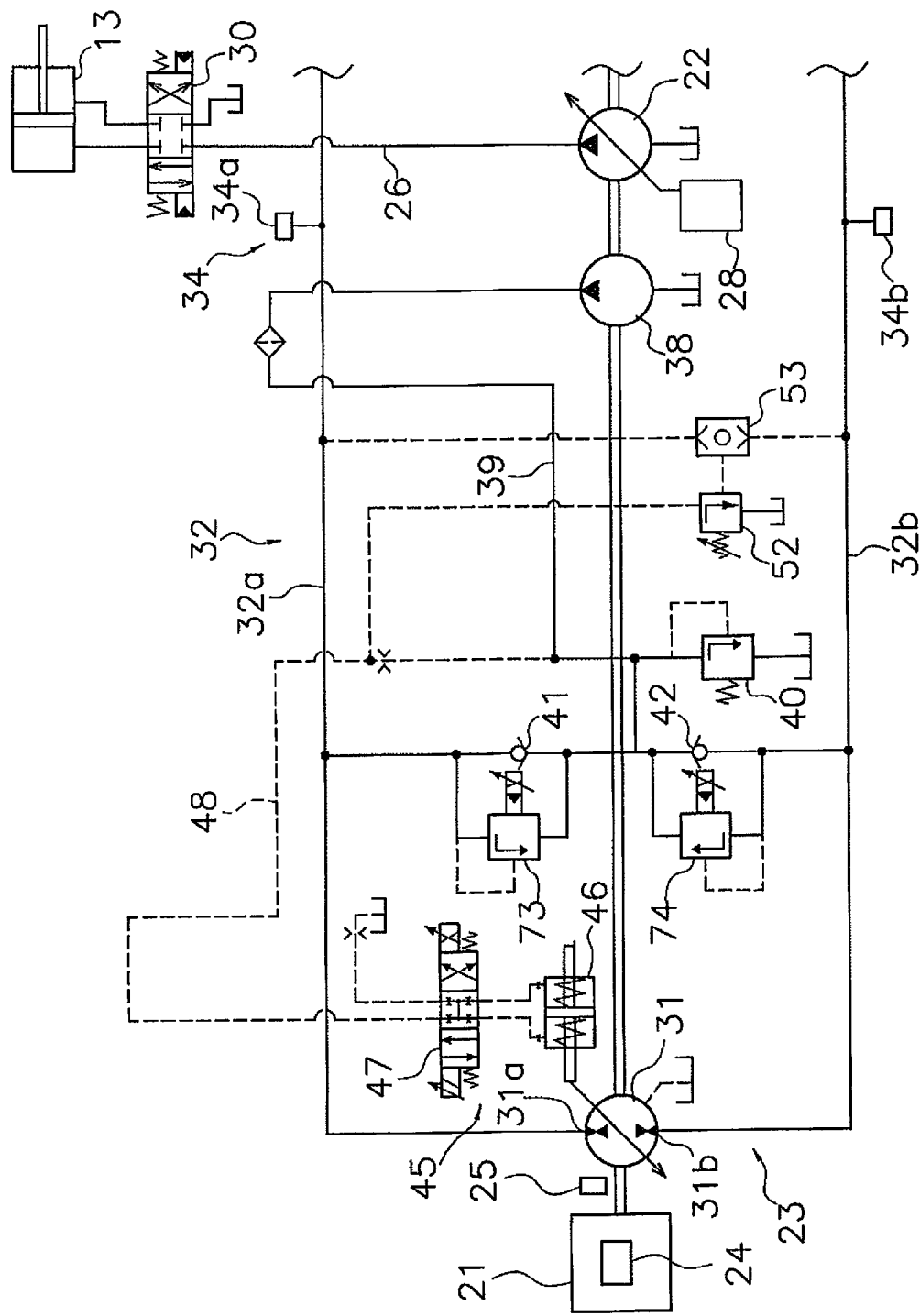
FIG. 17 is a block diagram illustrating a configuration of the drive system of the work vehicle according to the fourth embodiment.

Processing according to a fourth embodiment of the switching control of the clutch 54 will be explained next. FIG. 16 is a timing chart illustrating processing according to the fourth embodiment. FIG. 17 is a block diagram illustrating a configuration of the drive system of the work vehicle 1 according to the fourth embodiment. In the work vehicle 1 according to the fourth embodiment, a first relief valve 73 and a second relief valve 74 are respectively provided in place of the first relief valve 43 and the second relief valve 44 in the drive system of the work vehicle 1 in the abovementioned first embodiment. The first relief valve 73 and the second relief valve 74 are electromagnetic proportional control valves that is configured to variably control the relief pressure. The controller 72 is connected to the relief valves 73 and 74 by wire or wirelessly. The controller 72 outputs instruction signals to the relief valves 73 and 74 thereby variably controlling the relief valves.

In the processing according to the fourth embodiment, the controller 72 reduces the relief pressure of the relief valves 73 and 74 in place of increasing the displacement of the second travel motor 33b in the abovementioned step S204.

As illustrated in FIG. 16, the controller 72 reduces the displacement of the first travel motor 33a to zero and reduces the relief pressure of the relief valves 73 and 74 from a normal value PI1 to a reduced value PI2 during the switching so as to offset the flow rate excess in the drive hydraulic circuit 32 in accordance with the reduction in the displacement of the first travel motor 33a. The value PI2 during the switching is, for example, a value that corresponds to the drive circuit pressure at the time of starting to reduce the displacement of the first travel motor 33a. The controller 72 acquires the drive circuit pressure at the time of starting to reduce the displacement of the first travel motor 33a with signals from the first circuit pressure sensor 34a and the second circuit pressure sensor 34b.

The controller 72 maintains the relief pressure at the reduced value PI2 for a predetermined time period from the start of the reduction of the displacement of the first travel motor 33a. The predetermined time period is preferably longer than the time period from the start until the completion of the reduction of the displacement of the first travel motor 33a in consideration of the response delay of the relief valves 73 and 74. The controller 72 returns the relief pressure from the reduced value PI2 to the normal value PI1 after the predetermined time period has elapsed. The reduced value PI2 may be a fixed value. Alternatively, the reduced value PI2 may be a value that corresponds to the accelerator operating amount or the engine rotation speed.

Figure 18:
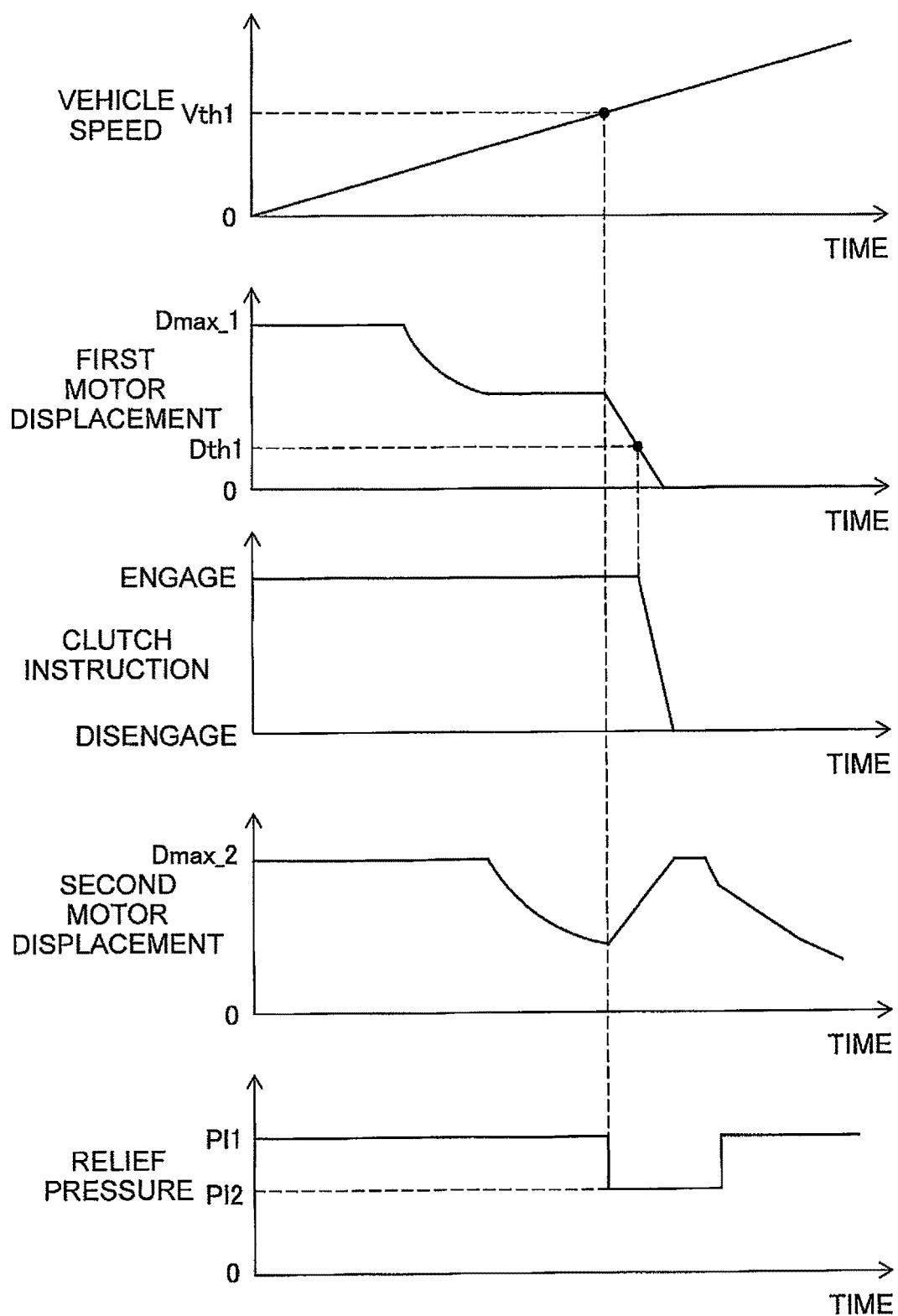
FIG. 18 is a timing chart illustrating processing according to a modified example of the fourth embodiment.
Figure 19:
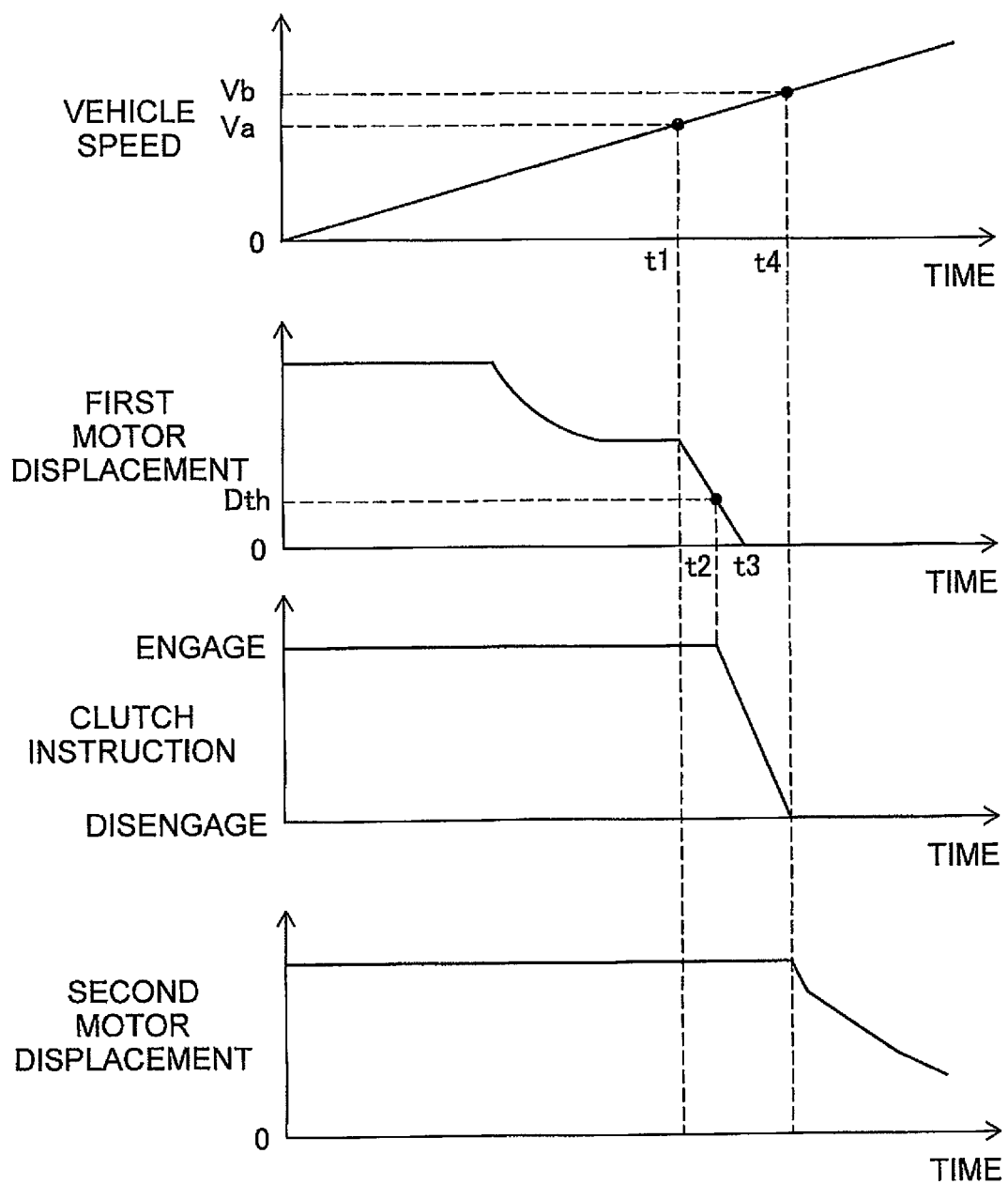
FIG. 19 is a timing chart illustrating processing according to a related technique.

Alternatively, as illustrated in FIG. 18, the controller 72 may reduce the displacement of the first travel motor 33a to zero, and increase the displacement of the second travel motor 33b and reduce the relief pressure of the relief valves 73 and 74 from the normal value PI1 to the reduced value PI2 so as to offset the flow rate excess in the drive hydraulic circuit 32 in accordance with the reduction in the displacement of the first travel motor 33a.

Although embodiments of the present invention have been described, the present invention is not limited to the above embodiments and various modifications may be made within the scope of the invention.

The work vehicle 1 is not limited to a wheel loader and may be another type of vehicle such as a motor grader or the like. The configurations of the drive system and the control system of the work vehicle 1 are not limited to the ones described in the above embodiments and may be changed. For example, the displacement of the travel pump 31 may be controlled by another control valve and the control of the travel pump 31 is not limited to the pump control valve 47. That is, a control valve for controlling the pressure of the hydraulic fluid supplied to the pump control cylinder 46 through the pump pilot circuit 48 may be provided separately from the pump control valve 47. The second travel motor 33b may be a fixed displacement motor such as a gear pump or the like.

The parameters used in the various abovementioned computations are not limited to the ones indicated above and may be changed. Alternatively, parameters other than the abovementioned parameters may be used in the computations. The various abovementioned data may be expressed, for example, by formulas or may be formats such as tables or maps.

The controller 72 may determine the target vehicle speed with a method different from the methods described in the embodiments. The controller 72 may determine the target engine rotation speed with a method different from the methods described in the embodiments. The controller 72 may determine the target displacement of the travel pump 31 with a method different from the methods described in the embodiments. The controller 72 may determine the target displacement of the travel motors 33a and 33b with a method different from the methods described in the embodiments.

The controller 72 may combine two or more of the controls according to the abovementioned first to fourth embodiments and the modified examples of the embodiments.

According to the present invention, speed change shock that occurs when switching from travel with two motors to travel with one motor can be reduced in a work vehicle provided with a hydrostatic transmission.

What is claimed is:

1. A work vehicle comprising:
an engine;
a travel pump configured to be driven by the engine;
a hydraulic circuit connected to the travel pump;
a first travel motor connected to the travel pump via the hydraulic circuit;
a second travel motor connected to the travel pump via the hydraulic circuit;
a flow rate control device configured to control a flow rate of hydraulic fluid in the hydraulic circuit;
a drive shaft connected to the first travel motor and the second travel motor;
a clutch disposed between the first travel motor and the drive shaft;
a sensor configured to output a signal indicative of a vehicle speed; and
a controller configured to
receive the signal from the sensor and
control the first travel motor and the clutch,
the controller being further configured to
when the vehicle speed increases and reaches a predetermined switching threshold, reduce a displacement of the first travel motor and control the flow rate control device to offset a flow rate excess in the hydraulic circuit in accordance with reduction in the displacement of the first travel motor; and
execute a switching control to switch the clutch from an engaged state to a disengaged state after the vehicle speed has reached a switching threshold.

2. The work vehicle according to claim 1, wherein
the flow rate control device is configured to control a displacement of the second travel motor, and
during the switching control, the controller is further configured to reduce the displacement of the first travel motor and to control the flow rate control device to increase the displacement of the second travel motor to offset the flow rate excess in the hydraulic circuit in accordance with the reduction in the displacement of the first travel motor.

3. The work vehicle according to claim 2, wherein
the controller is further configured to control the flow rate control device to reduce the displacement of the second travel motor when the vehicle speed increases and before the vehicle speed reaches the switching threshold.

4. The work vehicle according to claim 3, wherein
the controller is further configured to control the flow rate control device to reduce the displacement of the second travel motor and lowers the rotation speed of the engine when the vehicle speed increases and before the vehicle speed reaches the switching threshold.

5. The work vehicle according to claim 1, wherein
the flow rate control device is configured to control a displacement of the travel pump, and
during the switching control, the controller is further configured to reduce the displacement of the first travel motor and to control the flow rate control device to reduce the displacement of the travel pump to offset the flow rate excess in the hydraulic circuit in accordance with the reduction in the displacement of the first travel motor.

6. The work vehicle according to claim 1, wherein
the flow rate control device is configured to control a rotation speed of the engine, and
during the switching control, the controller is further configured to reduce the displacement of the first travel motor and to control the flow rate control device to lower the rotation speed of the engine to offset the flow rate excess in the hydraulic circuit in accordance with the reduction in the displacement of the first travel motor.

7. The work vehicle according to claim 1, wherein
the flow rate control device is a relief valve that is provided in the hydraulic circuit, and the relief valve is configured to change a relief pressure, and
during the switching control, the controller is further configured to reduce the displacement of the first travel motor and to control the flow rate control device to reduce the relief pressure of the relief valve to offset the flow rate excess in the hydraulic circuit in accordance with the reduction in the displacement of the first travel motor.

8. A method executed by a controller to control a work vehicle, the work vehicle including an engine, a travel pump configured to be driven by the engine, a hydraulic circuit connected to the travel pump, a first travel motor connected to the travel pump via the hydraulic circuit, a second travel motor connected to the travel pump via the hydraulic circuit, a flow rate control device configured to control a flow rate of hydraulic fluid in the hydraulic circuit, a drive shaft connected to the first travel motor and the second travel motor, and a clutch disposed between the first travel motor and the drive shaft; the method comprising:
receiving a signal indicative of a vehicle speed;
reducing a displacement of the first travel motor and controlling the flow rate control device to offset a flow rate excess in the hydraulic circuit in accordance with reduction in the displacement of the first travel motor when the vehicle speed increases and reaches a predetermined switching threshold; and
executing a switching control to switch the clutch from an engaged state to a disengaged state after the vehicle speed has reached the switching threshold.

* * * * *